United States Patent [19]
Woo et al.

[11] Patent Number: 4,482,671
[45] Date of Patent: Nov. 13, 1984

[54] BASE FOR A GRAFT POLYMER, NOVEL GRAFT POLYMER COMPOSITIONS, SOLVENT AND WATER-REDUCIBLE COATINGS INCORPORATING THE NOVEL GRAFT POLYMERS, AND PROCESSES FOR MAKING THEM

[75] Inventors: James T. K. Woo, Medina, Ohio; Vincent W. Ting, Boulder, Colo.; Richard M. Marcinko, North Royalton, Ohio

[73] Assignee: SCM Corporation, New York, N.Y.

[21] Appl. No.: 438,375

[22] Filed: Nov. 1, 1982

Related U.S. Application Data

[62] Division of Ser. No. 132,507, Mar. 21, 1980, Pat. No. 4,399,241.

[51] Int. Cl.$^3$ .................... C08L 63/02; C08L 67/00
[52] U.S. Cl. ...................... 525/31; 523/402; 523/403; 523/404; 523/407; 523/408; 523/436; 525/65; 525/69; 525/71; 525/74; 525/416; 525/438; 525/445; 525/454; 525/455; 525/524; 525/529; 525/531; 525/930
[58] Field of Search .................. 525/63, 65, 69, 74, 525/71, 438, 454, 416, 524, 930, 31; 523/404, 423

[56] References Cited

U.S. PATENT DOCUMENTS

| | | | |
|---|---|---|---|
| 3,110,695 | 11/1963 | Ceresa | 525/374 |
| 3,215,757 | 11/1965 | Scheibli et al. | 525/122 |
| 3,336,253 | 8/1967 | Wong et al. | 260/29.2 EP |
| 3,336,257 | 8/1967 | Alvey | 528/93 |
| 3,356,624 | 12/1967 | Neal et al. | 260/18 |
| 3,449,281 | 6/1969 | Sullivan et al. | 260/29.2 EP |
| 3,636,133 | 1/1972 | Hawkins | 525/122 |
| 3,687,894 | 9/1972 | Collings et al. | 260/33.4 EP |
| 3,761,542 | 9/1973 | Kosaka et al. | 525/193 |
| 4,090,991 | 5/1978 | Fukusaki et al. | 260/23 EM |
| 4,107,116 | 8/1978 | Rien et al. | 525/122 |
| 4,116,903 | 9/1978 | Lietz et al. | 260/22 CB |

Primary Examiner—Theodore E. Pertilla
Attorney, Agent, or Firm—Thomas M. Schmitz

[57] ABSTRACT

Provides new and improved water-reducible coating compositions and methods of making them. Three preferred processes are disclosed. These differ in the manner of incorporating and chemical nature of an extender polymer.

Broadly, the process of the invention is one for forming an aqueous dispersion of a fluent resinous composition of a. a mixture in an organic solvent of
 (i) an ionizable graft polymer of an epoxy resin and an addition polymerized resin, the addition polymerized resin being bonded to aliphatic backbone carbon atoms of the epoxy resin by carbon-to-carbon bonds, and
 (ii) an extender resin;
b. an aqueous vehicle, and
c. an ionizing agent;

the ionization present from said combined components being sufficient to establish the components as a dispersion in the aqueous vehicle, and then addition polymerizing a quantity of addition polymerizable monomer, under addition polymerizing conditions, in said aqueous dispersion, the aqueous dispersion serving as a vehicle therefor.

In another aspect of the invention, a grafting base is produced by advancing an aromatic epoxy resin in the presence of at least one extender resin and a sufficient amount of an organic solvent to render the initial mixture and grafting base product fluent.

11 Claims, No Drawings

BASE FOR A GRAFT POLYMER, NOVEL GRAFT POLYMER COMPOSITIONS, SOLVENT AND WATER-REDUCIBLE COATINGS INCORPORATING THE NOVEL GRAFT POLYMERS, AND PROCESSES FOR MAKING THEM

This is a division of application Ser. No. 132,507, filed Mar. 21, 1980, now U.S. Pat. No. 4,399,241 issued Aug. 16, 1983.

RELATED PATENT APPLICATIONS

The subject matter of the present patent application is related to the subjects matter of several other patent applications, the teachings of which, particularly as identified below, are all incorporated herein by reference.

The earliest-filed application on related technology is Ser. No. 685,246, filed May 11, 1976, and now abandoned.

Another patent application on related subject matter is Ser. No. 788,611, filed Apr. 18, 1977, which was a continuation-in-part of the first-filed patent application, and which has been published as Belgian Pat. No. 854,476, granted Nov. 10, 1977, and as German OS No. 2,721,822, published Nov. 24, 1977.

A third application on related subject matter is Ser. No. 788,454, filed Apr. 18, 1977, and now abandoned, which was also a continuation-in-part of the first-filed patent application. This third patent application was abandoned in favor of Ser. No. 793,507, filed May 4, 1977, which is published as Belgian Pat. No. 854,523, granted Nov. 14, 1977; as German OS No. 2,721,823.1; and as Dutch Patent Application No. 77.05236, published Nov. 11, 1977.

U.S. application Ser. No. 793,507 is a continuation-in-part of Ser. No. 788,454. It was abandoned in favor of a continuation application, Ser. No. 038,547, filed May 14, 1979.

A fifth patent application on related subject matter is Ser. No. 29,106, filed Apr. 11, 1979.

FIELD OF THE INVENTION

This invention relates to a process for making a fluent, filterable blended material containing an epoxy resin and a second, extender polymer, both of which have aliphatic backbone carbon atoms at which grafting can take place, and processes for making such blends.

The invention is also concerned with the processes for making novel graft polymer compositions from these blends, and to coating compositions utilizing these novel graft polymer compositions, and to the products thus obtained.

In a particular and preferred embodiment, the invention is concerned with sprayable, water-reducible coating compositions suitable for application to the interior of metal containers, such as cans, useful for packaging beverages.

BACKGROUND OF THE PRESENT INVENTION

There is a continuing demand for improved types of coating compositions, both solvent-based and water-reducible. More specifically, there is a continuing and growing demand for water-reducible, sprayable compositions suitable for application to metal surfaces intended to come in contact with beverages, and especially, for lining the interior of beverage cans.

Of the patent applications identified above, Ser. Nos. 685,246, 788,611 and 793,507 describe novel, sprayable, water-reducible coating compositions that are particularly useful for lining beverage cans. The compositions described have superior metal-coating characteristics derived from an epoxy resin component, and economy contributed by a vinyl resin component. These important characteristics are available, moreover, in compositions that when cured meet the many demanding tests with which any beverage can lining composition is confronted.

Nevertheless, the need for continuing improvement in functional characteristics, in economy, and in properties that facilitate compliance with environmental protection legislation, particularly with respect to the release of solvents to the atmosphere, indicate the need for still further technological change and progress.

The first-filed application above, Ser. No. 685,246, in one preferred embodiment, discloses a process for preparing a curable resinous composition having an Acid Number of at least 30, by reacting together at 90° C. to 130° C. an aromatic 1,2-epoxy diepoxide resin having a molecular weight above 350 and addition polymerizable monomer of which from 10% to 80% by weight is an acrylic acid, the diepoxide resin being present in sufficient quantity to provide from 10% to 90% by weight of the initial reaction mixture, in the presence of a free radical initiator of the benzoyl peroxide type. During the reaction there is simultaneous addition polymerization of the monomer through its ethylenic unsaturation and grafting of addition polymer to the epoxy resin. The graft polymer is characterized by the substantial absence of hydrolyzable functional groups. The ionizability of the reaction mixture, by reason of its acid functionality, is sufficiently high to effect stable dispersion of the product in an aqueous ionizing medium.

In a preferred embodiment, an aromatic diepoxide such as a polyglycidyl ether of bisphenol A is reacted with a mixture of addition polymerizable monomers containing a major amount of methacrylic acid. The epoxy resin has a molecular weight of at least 1,000, and provides from 30% to 90% of the initial reaction mixture. The reaction takes place in the presence of benzoyl peroxide at a temperature of 90° C. to 130° C., to effect addition polymerization of the monomer and to produce a graft polymer of addition polymer to the diepoxide having an Acid Number of 30 to 150 or more, preferably 70–90. The reaction product may be dispersed in a basic aqueous medium, to form a water-reducible coating composition. Generally a cross-linker is added, such as an aminoplast, and curing is effected in an oven. Most preferably the epoxy resin has a molecular weight in the range 4,000 to 10,000 and provides 50% to 90% of the initial reaction mixture.

As is more particularly pointed out in patent application Ser. No. 788,611, the resinous reaction product produced contains three polymeric components, namely, the graft polymer, ungrafted epoxy resin, and ungrafted addition polymer.

As is pointed out in Ser. No. 793,507, the initial epoxy resin, that is employed in the graft polymer production process, may be terminated to eliminate part or all of the terminal epoxy groups, to eliminate ester grafting at the terminal epoxy groups. Elimination of the terminal epoxy groups also permits the efficient use of a wider variety of peroxide-type free radical initiators, over a broader reaction temperature range, than would otherwise be the case.

As is disclosed in these prior applications, in order to make acceptable water-reducible coating compositions, the addition polymerizable monomer comprises a major proportion of an unsaturated carboxylic acid, preferably either acrylic or methacrylic acid. Sufficient acid is employed so that the Acid Number (NV, i.e., based on non-volatiles) of the reaction product is from about 30 to 200. The ionizability of compositions prepared in accordance with these several patent applications is based on the acid functionality of the graft polymer and of the ungrafted addition polymer. When the carboxyl groups are ionized by the addition of such a composition to an aqueous vehicle containing an amine or other fugitive base, an aqueous dispersion is produced that is water-reducible. Such dispersions are stable over long storage periods even at somewhat elevated temperatures, and remain free from gelation and precipitation. Only slight changes occur in pH levels and viscosities, indicating very little change in composition.

The reaction products of these prior applications appear to have remarkable properties. Their contents of ionized polymers are believed to serve as the means by which the ungrafted, nonionized epoxy resin component is kept in stable suspension.

For sanitary coating applications of the prior applications, Ser. Nos. 788,611 and 793,507, the preferred compositions are obtained from initial reaction mixtures in which the solids are derived 50% or more by weight from an epoxy resin having a molecular weight of at least 4,000, and the balance from addition polymerizable monomer of which the major proportion is acrylic or methacrylic acid. In a more preferred embodiment of such a sprayable sanitary coating composition, the solids of the reaction mixture are derived from an epoxy resin that contributes from 60% to 90%, and preferably about 80%, by weight of the solids, the balance being a monomer mixture of methacrylic acid, styrene, and ethyl acrylate, where the acid is the predominant monomer. Preferred sanitary coating compositions produced from such reaction mixtures have Acid Numbers (N.V.) in the range from about 80 to about 90 and preferably about 85.

While resinous coating compositions of these kinds have excellent functional characteristics and other highly desirable properties, the high content of epoxy resin increases the cost. It would therefore be highly desirable to find some way to produce functionally equivalent materials, at lower cost.

Still another important consideration is the release of solvent materials into the atmosphere. In the process of making the reaction products of the patent applications described above, it has been customary to use liquid organic solvent to facilitate handling during the manufacturing process and to improve application properties. In the most preferred embodiment of the invention, for example, it has been customary to use two different solvents, a first solvent in which the epoxy resin, the graft polymer, and the addition polymer are all soluble, and a second solvent that can dissolve the addition polymer product and that can solvate the addition polymer side chains of the graft polymer. The solvents remain with the resinous reaction product after it is dispersed by the addition of water and a fugitive base, and more may be added to adjust application characteristics. A typical ratio of total organic solvent to total film-forming resinous solids (OS/S) is about 0.9, in a formulated, sprayable, sanitary coating composition. Consequently, when an applied coating is cured, which is usually accomplished by heating, the solvent is driven off and ordinarily escapes into the atmosphere. With the present concern over the release of organic solvent materials into the atmosphere, it is highly desirable that coating compositions be prepared in such manner as to reduce the amount of organic solvent liquid present to the smallest feasible amount.

In the fifth patent application referred to above, Ser. No. 29,106, filed Apr. 11, 1979, coating compositions and processes for making them were disclosed that advanced the art by providing compositions having the functional characteristics adverted to in connection with the inventions described above in the other copending applications, but containing a greater proportion of addition polymer, thereby permitting economies, and also containing a smaller proportion of volatile organic solvent, thereby facilitating compliance with environmental protection laws.

Improved water-reducible coating compositions are made in accordance with this application by polymerizing in situ, in an aqueous dispersion of a resinous reaction product produced in accordance with a process of one of the earlier-filed patent applications described above, a limited quantity of addition polymerizable monomer containing ethylenic (vinyl) unsaturation, such as styrene. The result is to reduce substantially the percentage of the final composition solids represented by the initial epoxy resin, and to increase substantially the percentage of the final composition solids formed from ordinarily much less expensive addition polymerizable monomer. The resulting increase in solids and decrease in the proportion of solvent are important advantages. Moreover, the proportion of solvent may be further reduced by the addition of water during or after the in situ addition polymerization reaction. A typical OS/S ratio would be about 0.7, for a fully formulated sprayable sanitary coating composition.

The addition to the dispersed, graft polymer-containing resinous reaction product, of vinyl polymers formed by the in situ polymerization reaction, offers a still further advantage, namely, an improved set of physical and chemical characteristics for certain applications, important among which is improved resistance to weathering.

BRIEF SUMMARY OF THE INVENTION

In its broadest aspects, this invention provides new and improved polymeric products and processes for making them, and new and improved coating compositions and processes for making them, especially water-reducible coating compositions that are characterized by desirable application and functional properties, very low solvent release to the atmosphere, and economical formulation.

A first preferred mode of the process of the invention involves these steps:
1. Forming a fluent blend of an aromatic epoxy resin with an extender polymer in an organic solvent, preferably substantially free from particulate matter. The extender polymer may be a (Type A, saturated) material such as:
   a. polystyrene;
   b. low molecular weight polyethylene;
   c. a styrene-acrylate copolymer;
   d. an ethylene-vinyl acetate copolymer;
   e. a hydroxyl-terminated polyester of polyurethane;
   f. styrene-acrylonitrile copolymers;
   g. almost any hydrocarbon resin;

h. a second epoxy resin, selected for its properties, cost, or the like, or i. a mixture of one or more of these.

2. Advancing the epoxy resin with a diphenol or other polyfunctional extender, generally at a temperature in the range from 130° C. to 250° C. The extent of the advance is controlled so that the mix remains tractable. When a polyglycidyl ether of bisphenol A is advanced by reaction with bisphenol, a temperature of about 180° C. is a useful reaction temperature. However, when a hydroxyl-terminated polyester is employed as all or a substantial proportion of the extender, then a higher temperature, about 220° C., is used. The advancement in any case is arrested at a desired stage, by cooling, reacting some or all of the epoxy groups, or the like.

3. Adding ethylenically unsaturated monomer together with at least 3% by weight of the monomer of benzoyl peroxide, or equivalent peroxide-type initiator, and raising the temperature as needed to activate the initiator. In a preferred embodiment, the monomer contains enough of an acrylic acid to contribute at least 5% by weight of carboxyl (COOH) groups to the total solids present. There must be enough ionizability, through acid or base functionality, that the material can be established as a dispersion in a basic aqueous vehicle.

4. Adding water and an ionizing agent, to disperse all of the polymer solids in the aqueous vehicle 5. Performing a vinyl polymerization in situ, preferably with styrene or with styrene and an acrylic acid.

Sufficient ionizability must still be present to permit dispersion formation.

This process produces a dispersion that may be further diluted with water. It may also be formulated with pigments, a cross-linking agent, and the like, for application as a decorative and protective coating.

Steps 1 and 2 above prepare a grafting base, by blending a 1,2-epoxy resin having an epoxy equivalent weight (EEW) of at least 180-200, and preferably 500 or more, with a second, extender polymer, mixing the resin and the polymer with an organic solvent to form a fluent blend, and then advancing the epoxy resin in the presence of the extender polymer. The epoxy resin is advanced by reacting it with a polyfunctional compound that adds to the epoxy resin at its epoxide groups, to advance the resin to a higher molecular weight. The polyfunctional compound is preferably either a polyhydroxy compound or a polycarboxylic acid.

The grafting base may be one prepared in the manner described in the preceding paragraph, or it may be one prepared by blending together in a solvent an epoxy resin of suitable epoxy equivalent weight, preferably above 500, and more preferably not substantially below 2,000, and the extender polymer.

In a second preferred mode of the process of the invention, the extender polymer employed contains ethylenic unsaturation (Type B, unsaturated). It therefore offers convenient points of attachment for the later-added monomer, so that side chains may develop at each ethylenically unsaturated site. Looked at another way, it could be said that copolymerization occurs. Suitable such extender polymers include polybutadiene, unsaturated polyesters, unsaturated alkyds, polyisoprene, butadiene-styrene polymers, and acrylated resins that are ethylenically unsaturated. Except for the selection of the extender polymer, the steps are essentially the same as stated above. However, the chemical structures in the resulting grafting base are more complicated and diverse.

Both the epoxy resin and the extender polymer components of the grafting base should provide aliphatic backbone carbon atoms having one or two hydrogens bonded thereto in the ungrafted state, at which grafting can occur in the third, grafting step. Also, the extender polymer should be selected to be a film-former that remains in the film after baking at a temperature of at least 375° C. (190° C). Preferably it is soluble in the solvent used. Generally, it is inert to the epoxy resin and to the advancing agent but it may simply be relatively inactive as to the epoxy resin and substantially less reactive to the advancing agent than the epoxy resin at the temperature used for advancement, which generally is in the range from about 120° C. to about 200° C.

The second step of advancing the epoxy resin includes the step of arresting the advancement. This may be either an active step, involving cooling, for example, or a passive step, i.e., complete consumption of the reactants, or a combination of both.

The third step involves polymerizing ethylenically unsaturated monomer in the presence of the grafting base, and in the presence of an initiator. When the extender polymer is a Type A, saturated polymer, this step is carried out in the presence of at least 3% and preferably more than 4% by weight, based on the monomer weight, of benzoyl peroxide (BPO) or other suitable peroxide-type initiator that has the ability simultaneously to initiate (1), addition polymerization of the monomer through its ethylenic unsaturation, and (2), graft polymerizaton of addition polymer to aliphatic backbone carbon atoms of the epoxy resin and of the extender polymer. Suitable initiators must be capable of initiating addition polymerization through ethylenic unsaturation. When extender polymer is saturated, the initiator also must have the ability to abstract hydrogen from a backbone carbon, to permit carbon-to-carbon grafting to occur.

When the extender polymer is Type B, unsaturated, the same considerations apply, subject to the proviso that less than 3% of the initiator may be needed since the reaction involves the unsaturated extender polymer as well as the epoxy resin. Consequently, the amount of initiator may be substantially as low as would suffice for initiating the addition polymerization and abstracting hydrogen and causing grafting in that manner. However, the use of a peroxide-type, hydrogen abstracting initiator, in an amount of at least 3% BPO or equivalent, is preferred, it is believed that this preferred mode induces grafting on both the epoxy resin and the extender polymer, whether the extender polymer is saturated or unsaturated.

The products of the process described in the preceding paragraph (the third step), like the grafting base, are novel and are useful in and of themselves. For example, the grafting base and these resinous reaction products can be formulated into useful solvent-based coating compositions for either air drying or baking.

Provided that the third step product contains a sufficient number of ionizable sites so that it is emulsifiable, as is preferred, it can be dispersed, as in the fourth step, in an aqueous vehicle containing an ionizing agent to make a water-reducible, dispersion-type coating composition. Such an aqueous dispersion is also a useful vehicle in which vinyl monomer can be polymerized in situ, as in the fifth step, to increase the solids content of the dispersion, and at the same time to decrease the relative proportion of organic solvent. The end product of this fifth process step is a water-reducible aqueous dispersion that is suitable for a variety of coating applications. In preferred embodiments, such compositions are sprayable and are useful for lining beverage cans.

A third preferred embodiment of the invention involves a variation in the order of the steps, as follows:
1. Advancing the epoxy resin (if necessary).
2. Addition polymerizing-grafting (as in Step 3 above).
3. Dispersing in an aqueous vehicle (as in Step 4 above).
4. Adding to the dispersion an extender resin.
5. Performing a vinyl polymerization in situ.

This variation embodiment of the invention is less preferred. If the extender polymer is saturated, there is less opportunity for grafting to occur, although some grafting seemingly does occur in the fifth, final step. If the extender polymer is unsaturated, then grafting will occur. This third process mode can of course be combined with each of the two process modes already described, which also can be combined with each other. As described in greater detail hereafter this variant process embodiment also produces water-reducible products that can be formulated into valuable coating compositions.

DETAILED DESCRIPTION OF THE PRIOR INVENTIONS; PROCESS AND PRODUCT

The prior inventions are most easily understood from a description of one specific preferred embodiment.

When making a sanitary coating composition in accordance with one preferred embodiment of one of the earlier patent applications described above, for example, Ser. No. 788,611, 70 to 80 parts by weight of an aromatic 1,2-epoxy resin are placed in a reaction vessel with a small amount of a solvent, such as, for example, 2-butoxy-ethanol-1. The epoxy resin may be purchased and used as is, in which case an initial epoxy equivalent weight (EEW) of about 4,000 is preferred, or alternatively, a low EEW resin may be reacted further with bisphenol A to produce an epoxy resin having the desired EEW of about 4,000.

A mixture of monomers containing ethylenic unsaturation is then prepared. In one preferred embodiment, this mixture is formed from about 65 weight percent methacrylic acid, 34 weight percent styrene, and 1 weight percent ethyl acrylate. Benzoyl peroxide (BPO) is incorporated in the mixture in an amount equivalent to about 6.7% of the monomer mixture by weight. This mixture is then added to the reaction vessel containing the epoxy resin over a period of time, at a temperature in the range from 110° C. to about 130° C., preferably about 115° C. to 120° C., and more preferably about 118° C., to permit the reaction to go forward. Sufficient butanol and 2-butoxy-ethanol-1 are added to facilitate agitation.

It is very difficult to make an accurate analysis of the reaction product that is obtained. However, current indications are that on a dry solids basis, the reaction product contains three different components, as follows:
1. about 38% of unreacted epoxy resin;
2. about 7% by weight of ungrafted addition polymerized monomer, and
3. about 55% of a graft polymer, in which 65% of the original addition polymerizable monomer has polymerized and grafted to about 53% of the original epoxy resin.

All of these values are approximations due to limitations in analytical techniques.

Studies on this reaction and the product produced indicate that grafting takes place at aliphatic backbone carbons of the epoxy resin that have either one or two hydrogens bonded thereto in the ungrafted state. Pictorially, bonding takes place at one of the carbons indicated by the arrows below:

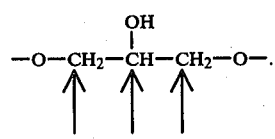

The graft polymer product consists of an epoxy resin molecule, of about 8,000 molecular weight, grafted with, on the basis of statistically averaged information, about two short chains of addition copolymer per molecule of epoxy resin, the molecular weight of each chain being about 1,500, so that the molecular weight of the graft polymer itself is about 11,000. This structure is one that can be represented generally as follows:

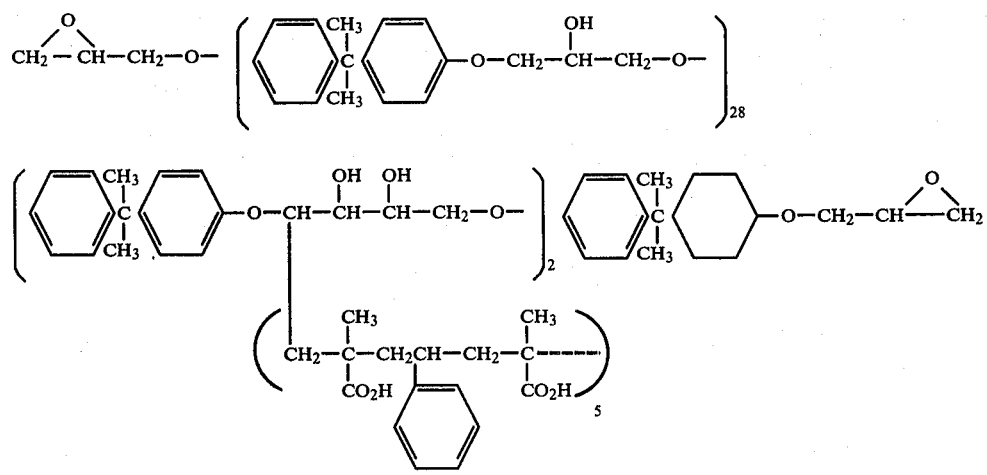

Gel permeation chromatography indicates that the molecular weight of the unreacted epoxy resin in the final product is somewhat lower than that of the initial epoxy resin, indicating that higher molecular weight epoxy resin tends to be grafted preferentially. This probably occurs because there are more grafting sites per molecule in the higher molecular weight epoxy resin molecules. The available analytical data also indicates that during the polymerization of the mixture of addition polymerization (vinyl) monomers, very little homopolymer is formed, and that the ungrafted acrylic copolymer has a longer chain length (higher molecular weight) than the grafted acrylic copolymer.

The resinous reaction product, which is a mixture of the three components described above, has an Acid Number of about 85, and a percent oxirane oxygen content, as determined by the analytical method described in the patent applications described above, of about 0.35, or less.

During the manufacturing process, the solvent content of the product is adjusted periodically so that in this preferred embodiment, the final product is about 58%–60% by weight solids, the balance being a solvent system consisting of a mixture of n-butanol and 2-butoxy-ethanol-1.

To prepare a coating composition useful for spray application to cans for beverages, the resinous reaction product is mixed with deionized water and a fugitive base, which in the preferred embodiment is dimethyl ethanolamine. Sufficient water is employed so that the non-volatiles content of the composition is about 21% to 24%, with a pH of about 7.8. About 10% to 11% by weight of the initial epoxy resin of a suitable crosslinking aminoplast resin, such as, for example, Cymel 370, a product of American Cyanamid Company, is then added. After thorough mixing, the resulting dispersion remains stable on storage indefinitely. It sprays readily with particularly good application properties. It cures rapidly on baking. The coatings produced are bland, and do not impart any undesirable organoleptic property or haze to a canned beverage or other food product.

The difficulty in analyzing the resinous reaction product obtained from the graft polymerization step cannot be overemphasized. Moreover, the composition of the product obtained depends upon the initial molecular weight of the epoxy resin, the proportions of the reactants, and the amount of BPO or equivalent initiator employed, among other factors. Consequently, for the preferred embodiment described above, the analytical data reported should be understood to be approximate. The proportion of the molecular weight of the graft polymer that is contributed by the addition polymer side chains is particularly difficult to determine, but probably is in the range from about 16% to about 20%, for this particular, preferred embodiment.

One of the interesting properties observed, as to the resinous reaction product, is that its Tg is about 30° C.–65° C. This compares with much higher Tg values for the initial epoxy resin component; for a copolymer that is prepared by the addition polymerization of a monomer mixture such as was used; and for a mixture of the initial epoxy resin with such a copolymer; the Tg values for these being, respectively, generally in the range from about 80° C. to 85° C.; about 110° C.; and about 75° C. to 80° C.

For other embodiments of the invention than the can coating embodiment just described, the particular components employed, and their proportions, for making the resinous reaction product containing the graft polymer, are subject to a broad discretion, depending upon the intended application. The epoxy resin may have a molecular weight in the range from about 350 to about 40,000 or higher, the limiting factor being the ability to handle the epoxy resin on a practical basis. The amount of epoxy resin may be in the range from about 5% by weight to about 95% by weight of the initial reaction mixture, dry solids basis.

To make a preferred sprayable sanitary coating composition, the molecular weight of the epoxy resin, preferably a diglycidyl ether of bisphenol A, generally is in the range from 4,000 to 20,000, or higher, or more preferably for practical manufacturing processing, in the range from about 8,000 to 12,000 or so. The proportion of epoxy resin in the initial reaction mixture preferably is from about 60% to about 90% by weight, and more preferably, 70% to 80%. Sufficient methacrylic acid or the equivalent should be employed in the monomer component so that the Acid Number of the resinous reaction product, based on solids, is in the range from 80 to 90. For use it is dispersed in water with an amine ionizing agent, and preferably a cross-linker is added. The coating is baked to cure it, and to drive off fugitive ionizing agent.

For all of these and other coating applications, the amount of benzoyl peroxide or other equivalent initiator employed in the grafting-addition polymerization reaction should be above 3% by weight based on the monomer, preferably more than 4% and most preferably in the range from about 6% to 7%. This permits the use of reaction temperatures in the range from about 110° C. to about 130° C., preferably about 115°–120° C., for efficient operation. If the epoxy resin is terminated, however, higher reaction temperatures and other peroxide-type initiators can be employed. If active epoxy groups are present, temperatures above about 130° C. tend to favor ester formation, rather than carbon-to-carbon grafting.

DETAILED DESCRIPTION OF THE PRESENT INVENTION

The following description, until indicated otherwise, refers to the first, preferred embodiment of the process of this invention.

FIRST PREFERRED EMBODIMENT

Steps 1 and 2

The Grafting Base

To make the novel grafting base, an aromatic or aliphatic epoxy resin, preferably an aromatic 1,2-epoxy diepoxide resin is blended with the extender polymer and organic solvent. The term "epoxy resin" as used herein is intended to encompass those aliphatic and/or aromatic resins which may be defined as polyethers containing terminal oxirane groups. In the usual and preferred case, the epoxy resin will be a diglycidyl polyether of bisphenol A or a similar diphenol, in which the terminal oxirane groups are separated by alternating aromatic and aliphatic units.

The two polymeric materials, either before or after being blended together, are generally mixed with an organic solvent which facilitates handling of the blend, and preferably in which the blend is soluble. This mixture should be fluent, i.e., easily stirred, and while it may be a slurry, it preferably forms a clear solution free from particulate resinous material. The terms "fluent" and "tractable" refer to the ability to mix on a practical basis with conventional mixing equipment such as a turbine or propellor mixer. At 180° C., this means that the viscosity would be about 200,000 cps. maximum.

The epoxy resin is then advanced by reaction with a polyfunctional compound that adds to the epoxy resin at its epoxide groups, to increase its epoxide equivalent weight (EEW). This polyfunctional advancing agent generally will either not react with the extender polymer, or will react preferentially with the epoxy resin.

The extender polymer often is a saturated hydrocarbon polymer, such as a low molecular weight polyethylene, i.e., a polyethylene oil, grease, or wax, or polystyrene, polyisobutylene, or the like. This polymer, like the epoxy resin, preferably is one that has aliphatic backbone carbons that have either one or two hydrogens bonded thereto in the ungrafted state. Thus, low molecular weight hydrocarbon polymers such as those mentioned above, and in addition, other low molecular weight polymers such as polypropylene, copolymers of polyethylene, copolymers of polypropylene, poly(4-methylpentene-1), poly-alpha-methylstyrene, and other such hydrocarbon polymers are suitable for use.

Also suitable are acrylate polymers and copolymers such as styrene-acrylate copolymers, styrene-allyl alcohol copolymers, hydroxy-terminated polyurethane resins, and ethylene-vinyl acetate copolymers. Hydrocarbon resins such as polyindene, naphthalene polymers, and the like, are also useful. Polycoumarone and coumarone-indene resins may also be used.

The extender polymer may also be an epoxy resin, selected for example for special properties or for low cost. Thus expoxidized polybutadiene may be used. If desired, when an epoxy resin is used as the extender, some or all of the epoxy groups may be removed by chemical modification.

If the extender resin is one that is reactable with epoxy groups at temperatures on the order of those used in the advancement reaction, as would be the case with an acid-containing polyester, then a lower advancement temperature might be required. The modification of epoxy groups with benzoic acid or the like, in the presence of an extender resin such as a polyester, might lead to cross-linking to the epoxy group sites.

The polyfunctional compound that is employed to advance the epoxy resin may be an aromatic polyhydric alcohol, preferably a polynuclear polyhydroxy phenol; an aliphatic polyhydric alcohol; or a polycarboxylic acid, either of the saturated aliphatic kind or the cyclic unsaturated or aromatic kind. Particularly suitable aromatic polyhydric alcohols include bisphenol A, bisphenol F, novolac resins, and materials such as polyhydroxy diphenyl sulfone. Suitable aliphatic polyhydric alcohols include ethylene glycol, glycerol, butanediol, erythritol, polyethylene glycol, polypropylene glycol, including specifically such glycols as triethylene glycol, and the like. Suitable polycarboxylic acids and acid anhydrides are those of adipic, azelaic, sebacic, and succinic acids. Suitable cyclic acids include tetrahydrophthalic acid, hexahydrophthalic acid, and phthalic acid.

The organic solvent that is employed may be added, or, if the epoxy resin and the hydrocarbon polymer happen to be available in solution form on a commercial basis, it may be that the solvent already present will suffice. The epoxy resins are often available in liquid form at low molecular weights, or in solution form, at either low or moderately high molecular weights. Otherwise, a wide variety of solvents can be employed to dissolve or slurry the resins. A particularly preferred solvent is 2-butoxy-ethanol-1. This material is also a good solvent for many of the hydrocarbon extender polymers (both saturated and unsaturated) that are suitable for use in the present invention.

The extender polymer selected must be capable of dissolution in a solvent. This places an inherent limitation on the molecular weight of many of the extender polymer materials, such as, for example, polyethylene and polypropylene.

While the epoxy resin may have an EEW as low as about 180 to 200, such a resin does not have many aliphatic backbone carbon atoms suitable for grafting. Accordingly, it is preferred that the epoxy resin be a polyglycidyl ether of a bisphenol, preferably a diglycidyl ether of bisphenol A, and have an EEW of at least 500, and more preferably, not substantially below 2,000. Such preferred epoxy resins provide a number of available grafting sites.

The epoxy resin may contribute from 10% to about 90% or more by weight of the solids initially present in the mixture for making the grafting base. The balance of the solids for the grafting base is contributed by the extender polymer or by a mixture of suitable such polymers.

As a practical matter, at present water-reducible coating compositions from the fifth step would be designed for use for coating metal surfaces, because of the good wetting, adhesion, and barrier characteristics imparted by the epoxy resin. Consequently, in order that the characteristics of the epoxy resin may be apparent in the final coating composition products, the epoxy resin employed generally should contribute at least 5% and preferably at least 20% by weight of the total solids in the final product.

Generally, the final product (from step 5) may contain as little as 5% by weight of solids derived from the initial epoxy resin for such applications as a wood paint. For metal protective and decorative coatings, the epoxy resin should contribute at least 20% and preferably about 25%, and more preferably a minimum of 30% to 40% of final product (from step 5) solids, depending on the properties desired and those contributed by the extender polymers, with an upper limit of about 60% representing all that is required for the attainment of most desirable functional properties. Greater amounts of epoxy resin may be present, of course.

The desirable functional properties imparted by the epoxy resin include not only wetting and adhesion properties, but also the ability to form good barrier films, as between a can and its contents. Moreover, if the adhesion to the substrate is strong enough, the coating will act as though it were flexible (even though in fact it may not be). This is important in some types of fabrication where the substrate is coated first, then shaped mechanically while coated. Obviously the demands on coatings in such applications are severe. For sprayable sanitary coating composition materials (from step 5), an epoxy resin contribution to total solids of from 30% and preferably 40% to 60% is feasible, and with careful formulation and for good economy, from 45% to 50% is preferred at present, and represents an important formulating accomplishment of the present invention.

These final product figures are important with respect to the initial proportion of epoxy resin that must be present in the grafting base.

The proportion of total solids present to organic solvent in the initial mixture of epoxy resin and extender polymer, from which the grafting base is made, may be as little as is required to permit suitable handling for practical manufacturing operations. However, while the grafting base must be fluent or tractable to permit it to be worked in practical manufacturing operations, this characteristic can be derived from the use of an elevated temperature and not just from the use of solvent alone. The proportion of solvent used will depend upon the characteristics of the epoxy resin and of the extender polymer employed. Generally the practical limit is about a 60% concentration of solids in the solvent. While lower solids concentrations are usable, one of the objectives of the invention is to reduce the organic solvent content of the final product, and accordingly, a preferred operating range for solvent concentration in the grafting base is from about 40% solvent to about 60% solvent.

The third step of the process of the present invention, described below, is a grafting reaction. One feature of this reaction is the use of an unusually high proportion of free radical initiator relative to addition polymerizable monomer that is used in the reaction. The free radical initiator must be one that has hydrogen abstraction capability, to induce the formation of carbon-to-carbon bonding at aliphatic backbone carbons of the advanced epoxy resin and of the extender polymer, in the grafting base. The preferred free radical initiator for this purpose is benzoyl peroxide.

The benzoyl peroxide is employed at an elevated temperature in order to activate it. A temperature of 110° C. to 130° C. is preferred, and a more preferred operating temperature is one in the range from about 115° C. to about 120° C. In this operating temperature range, the benzoyl peroxide decomposes, forming, as one by-product, benzoic acid. There is a tendency for the benzoic acid to react with the epoxy groups of the epoxy resin, to form epoxy esters, and if the monomer used includes a carboxylic acid, it also may form esters.

To avoid or reduce ester formation and particularly, ester grafting, the epoxy resin may be reacted, when preparing the grafting base, with enough chemical terminating agent to eliminate the epoxy groups in part or substantially completely. Materials that are generally useful as terminating agents for the epoxy groups include the phenols, many of the carboxylic acids, primary and secondary amines, mercaptans, alcohols, and water. Ethylenically unsaturated terminating agents can be used, and will lead to addition polymerization reactions during the subsequent grafting step.

Bisphenol A is a preferred terminating agent for advancing the epoxy resin. For example, slightly less than 64 weight parts of Dow DER 333 liquid epoxy resin per 36 weight parts of bisphenol A, to about 60 parts of the DER 333 liquid epoxy resin per 40 weight parts of bisphenol A, represents a useful range for these particular reactants. One preferred terminated epoxy resin is a diglycidyl ether of a bisphenol, wherein the molar ratio of the diglycidyl ether to the bisphenol is from about 1.7 to about 1.5.

Other hydroxy materials that are useful as terminating agents include the cresols and the xylenols. Saturated fatty acids and aromatic monocarboxylic acids, such as benzoic acid, are particularly useful terminating agents, but like the monohydroxy compounds, they terminate without advancing the resin. They are thus useful in the present invention for terminating an epoxy resin that is at a desired molecular weight, and if used, preferably are used prior to the grafting reaction. Ordinarily the fatty acids can be used in a variety of commericial forms and need not be highly purified. However, acids such a palmitic, lauric, myristic, and stearic are very useful, in either refined form or as highly purified acids.

The primary and secondary amines are also useful terminating agents, and particularly, hydroxyl amines such as, for example, ethanolamine and diethanolamine. Tertiary amines are generally not suitable terminating agents, since they lack the presence of a labile hydrogen atom reactable with the epoxy group.

Some representative grafting base compositions, in terms of the solids present, are described in Tables 1A and 1B below. Each of the grafting bases described in these tables can be used in the practice of the invention. If at least about 40% by weight of the solids present in the final product are to have been contributed by the initial epoxy resin, then in practice careful control must be exercised in the grafting (third) step and in the in situ polymerization (fifth) step as to the amount of contributed to total solids by each of these steps.

TABLE 1A

| Representative Grafting Base Solids Compositions | | | | |
|---|---|---|---|---|
| | Epoxy Resin Component | | Extender Polymer Component | |
| Grafting Base No. | % by Weight Based on Solids | Identity* | % by Weight Based on Solids | Identity* |
| 1-1 | 95 | A | 5 | K |
| 1-2 | 95 | A | 5 | L |
| 1-3 | 95 | A | 5 | N |
| 1-4 | 94.4 | B | 5.6 | O |
| 1-5 | 85 | B | 15 | N |
| 2-1 | 80 | A | 20 | K |
| 2-2 | 80 | A | 20 | L |
| 3-1 | 70 | A | 30 | L |
| 3-2 | 70 | A | 30 | N |
| 4 | 50 | A | 50 | K |
| 5-1 | 40 | A | 60 | K |
| 5-2 | 40 | A | 60 | L |

*See Table 1B for the identities.

TABLE 1B

| Identities of Table 1A Solids Materials | | |
|---|---|---|
| Epoxy Resin | | |
| Code for Epoxy Resin Component | Composition | Estimated Approx. Mol. Wt. |
| A | Dow DER-333 epoxy resin advanced with bisphenol A (65/35) | 9,000 (manufacturer's figure) |
| B | liquid epoxy resin advanced with bisphenol A | 5,000 (approx.) (oxirane termination) |
| Extender Polymer | | |
| Code for Extender Polymer Component | Composition | Approx. Mol. Wt. |
| K | polystyrene | 15,000 (approx.) |
| L | polybutene 24 (Chevron Chemical Co.) | 950 |
| N | Cumar-R-1 (Coumarone-indene polymer from Neville Chemical Co.) | 730 |
| O | epoxidized polybutadiene | 700-800 |

Step Three

The Grafting Reaction: A, General

Enough solvent is employed to facilitate handling. The amount and kind of monomer to be employed will depend upon several factors. These include the proportions and identities of the epoxy resin and of the extender polymer in the grafting base, and the proportion and ionizability of the monomer to be added by the subsequent in situ vinyl polymerization step. Typical amounts of monomer to be added in this grafting step would be in the range from 5% to 50% by weight of the grafting base.

Any free radical source capable of hydrogen abstraction may be used as a catalyst (initiator). The preferred initiator is benzoyl peroxide. It is effective when used a concentration of at least 3% by weight of the monomer and at a temperature of about 100° C. to generally not above 130° C. Preferably the concentration is above about 4% based on monomer, and the temperature is in the range from 110° C. to 120° C. Most preferably, the concentration of benzoyl peroxide is from 6% to 7% based on monomer. Mixtures of peroxide-type initiators may also be used.

When the epoxy resin has been terminated, with the elimination of substantially all of the epoxy groups, there is no danger of an esterification reaction occurring between the epoxy resin and any ethylenically unsaturated carboxylic acid in the monomer component, or any acid decomposition product from the initiator. Accordingly, higher reaction temperatures may be employed for the grafting-addition polymerization reaction, and a wider variety of initiators may be employed, requiring or permitting the use of a much broader range of reaction temperatures. For example, dicumyl peroxide can be used at reaction temperatures of about 140° C. to 160° C., or even higher.

Examples of other initiators are alkyl peroxy esters, alkyl peroxides, alkyl hydroperoxides, diacyl peroxides, t-butyl perbenzoate, lauroyl peroxide, dicumyl peroxide, decanoyl peroxide, and caproyl peroxide.

The term "graft polymer resinous reaction product" and the briefer "resinous reaction product" are used to refer to the reaction mixture that is produced by this step. The epoxy resin and extender polymer preferably each have aliphatic backbone carbons having one or two hydrogens bonded thereto in the ungrafted state. In the presence of at least 3% benzoyl peroxide (BPO) or equivalent hydrogen-extracting initiator, based on monomer, the monomer is polymerized and simultaneously grafted at one or more of these backbone carbons, on the epoxy resin and, it is believed, on the extender polymer as well.

The resinous reaction product is believed to be properly characterized as a mixture of unreacted epoxy resin, unreacted extender polymer, and three other associatively-formed polymers. One of these associatively-formed polymers is the epoxy-based graft polymer. A second, Graft polymer is believed to be formed on the extender polymer. The third associatively-formed polymer is ungrafted addition copolymer.

The grafting reaction has several important results: an increase in the solids content of the mixture, with a relatively low cost material; a modification of the characteristics of the components of the grafting base, by the introduction of a different component that influences product characteristics in a desirable way, particularly with respect to hydrolytic stability, and weathering and mechanical properties; an increase in the compatability of those residual reactants present that are not grafted and that are otherwise mutually incompatible, in the solid state. This last point is particularly important with respect to unpigmented films formed from the products of this step, where clarity and transparency are important and where the presence of incompatible phases would lead to haziness or worse.

Another important result of the grafting reaction is the introduction of sites that are ionizable. The ionizable sites may be either anionic or cationic, depending upon the nature of the monomer component. For sanitary coating applications, they are anionic.

A concomitant result is that those sites along the backbones in the grafting base, that are most susceptible to attack, are preempted and occupied thus improving the resistance of the product to chemical attack.

Since the grafting reaction is effected by carbon-to-carbon bonding, the graft polymers produced are not susceptible to hydrolysis.

The Grafting Reaction: B, Acid-Functional Resinous Reaction Products

The vinyl monomer may be a single monomer but preferably is a monomer mixture. To make an acid-functional product, ethylenically unsaturated acids, particularly acrylic acid and methacrylic acid, are preferred components. Styrene is a valuable monomer for use because it is economical and has other desirable properties. Ethylenically unsaturated acid esters are also useful, such as, for example, ethyl acrylate, butyl acrylate, the corresponding esters of methacrylic acid, and the like.

The ethylenically unsaturated acids include true acrylic acid and lower alkyl substituted acrylic acids, that is, those acids having ethylenic unsaturation in a position that is alpha, beta, to a single carboxylic acid group. The preferred acrylic acid is methacrylic acid.

The monomer component will preferably contain a major proportion of an acrylic acid, preferably methacrylic acid. When a styrenic monomer such as styrene is employed, it constitutes, ordinarily, a minor portion of the monomer component. For those coating compositions that may come in contact with food, and for the preparation of beverage can coating compositions in particular, one preferred addition polymerizable monomer mixture is made from 70 parts by weight of methacrylic acid to 30 parts by weight of styrene to 1 part by weight of ethyl acrylate. Another preferred monomer mixture includes methacrylic acid, styrene, and ethyl acrylate, in the approximate weight ratio of 65:34:1 respectively.

The Grafting Reaction: C, Base-Functional Products

Base-functional resinous reaction products may be made by incorporating an amine in the graft polymer molecule. There are two preferred ways to do this.

First, an unsaturated amine, such as dimethylaminoethyl methacrylate or t-butyl amino ethyl methacrylate, is employed in the monomer mixture that is used to form the graft polymer resinous reaction product. In this case, the balance of the monomer mixture comprises monomer materials such as styrene, lower alkyl acrylates, hydroxyethyl acrylate, and the like.

Second, a material such as glycidyl methacrylate is included in a monomer mixture that does not include other functional monomers. This introduces epoxy groups into the side chains of the graft polymer product, and these can be reacted with primary or secondary amines, to make the graft polymer (and ungrafted addition copolymer) base functional.

In addition, if the ungrafted epoxy resin and the epoxy resin component of the graft polymer have terminal epoxy groups available for reaction, they may be reacted with primary or secondary amines, to impart some base functionality.

The Grafting Reaction: D, The Resinous Reaction Product

The solids produced by the grafting reaction should contain a sufficient number of ionizable sites so that when added to an aqueous medium containing an ionizing agent, the solids become established as a dispersion in the aqueous medium. The dispersibility or solubility of the product depends upon the strength and degree of ionization. The dispersibility should be at least sufficient that the entire resinous reaction product is readily dispersed in the aqueous vehicle in which ionization occurs.

Generally, where carboxylic acid monomer units are responsible for acid functionality, these units should constitute at least 5% by weight of the resinous reaction product of the grafting reaction, and preferably, at least about 10% or so. It is best to combine the weight percent of carboxylic acid units with a measurement of the Acid Number value for the resinous reaction product, based on non-volatiles (N.V.). Also, since some carboxylic acid units may be consumed during a grafting reaction, as by ester formation with epoxide groups, a second measure of acid functionality, such as Acid Number (N.V.), provides a better indication of ionizing potential. Generally, the Acid Number of the resinous reaction product of the grafting reaction should be in the range from 30 to 220, and preferably from 45 to 150.

In the case where the resinous reaction product of the grafting reaction is base-functional, a convenient indicator of ionizable potential is the tertiary amine nitrogen content, or the equivalent and the useful range is from about 0.1% tertiary amino nitrogen to about 5% tertiary amino nitrogen. A secondary amine nitrogen can be ionized, but has less effect. A tertiary amino nitrogen can be ionized by an acid, such as hydrochloric, lactic, or acetic acid, or by a quaternizing agent such as dimethyl sulfate. When the ionization is derived from quaternary nitrogen, a lower nitrogen content is needed for the same result than is the case where the ionization is derived from tertiary amine nitrogen.

SECOND PREFERRED EMBODIMENT

Steps 1, 2, and 3

The Grafting Base, and the Grafting Reaction

In the second preferred process for preparing a grafting base, the extender polymer contains ethylenic unsaturation. Polybutadiene is the preferred material in this category.

The ethylenic unsaturation offers a site at which side chains can attach during the addition polymerization-grafting step, in place of or in addition to grafting to the epoxy resin backbone. Similarly, further homopolymerization, or copolymerization with the addition polymerizable monomer, may occur, Also, all of these may occur at the same time. In fact, all of these possible addition polymerization reactions appear to occur, simultaneously with grafting to the epoxy resin. The limited evidence that is available indicates that all of these reactions do occur at once, especially where relatively high (25%) amounts of the extender polymer are present, and that simultaneously, grafting takes place by the attachment of side chains on the epoxy resin backbone, just as though the extender polymer were not present. That such grafting does occur is demonstrated by the stability of the aqueous dispersions that are obtained in the next step, and by the fact that films cast from either solutions or dispersions of the resinous reaction products are clear and free from haze.

Except for the composition of the grafting base, and subject to the above, the grafting reaction and the dispersion and in situ vinyl polymerization steps (Steps 4 and 5) are substantially the same.

Some representative grafting base compositions are described in Table 2 below.

TABLE 2

Representative Grafting Base Solids Compositions
Second Preferred Embodiment

| Grafting Base Nos. | Epoxy Resin Component | | Extender Polymer Component | |
|---|---|---|---|---|
| | % by Weight Based on Solids | Identity | % by Weight Based on Solids | Identity* |
| 6-1 | 85 | B* | 15 | M** |
| 6-2 | 70 | A* | 30 | M. |

*See Table 1B above
**M is polybutadiene (Lithene P₁, Rivertex Corp.) with an approximate molecular weight of 900.

Step Four

Dispersion in an Aqueous Medium

The term "aqueous dispersion" as used herein is intended to encompass both solutions and dispersions. Solutions generally require a higher degree of ionization than is practical or needed. This invention is primarily concerned with true dispersions, which may be defined as suspensions of colloidal or larger particles in an aqueous medium.

To form the resinous reaction product of the grafting reaction into an aqueous dispersion, it is mixed with water containing an ionizing agent. For this reason, the solvents used should be water-miscible.

For an acid-functional product, a fugitive base is used as the ionizing agent. For a base-functional product, the ionizing agent may be a fugitive acid, such as acetic acid. A fugitive ionizing agent is one that volatilizes at the curing temperature for the product, leaving no appreciable residue.

To convert a reaction mixture to an aqueous suspensions, the techniques employed are essentially conventional. An acid functional resinous reaction product is dispersed in deionized water using a base such as a primary, secondary, and tertiary alkyl, alkanol, or aromatic amine or alkanolalkyl mixed amine; e.g. monoethanol amine, dimethyl ethanol amine, diethanol amine, triethyl amine, dimethyl aniline, ammonium hydroxide, or the like. Ordinarily this is done by adding the amine to some water, and then mixing the resinous reaction product with the water.

The ease with which the dispersion will form will depend upon the number of ionized sites and the strength and degree of ionization. In some cases, agitation may be required to establish the dispersion, although preferably, the strength and degree of ionization will suffice so that a dispersion is easily established and maintained.

For water reducible protective and decorative coating compositions for general applications, there is great flexibility in formulation. Some representative compositions are described below in Table 2, in which the composition of the grafting base solids is not specified, but may be as described above.

TABLE 3

Step Three Products: Representative Dispersion Compositions

| Component | Parts by Weight | | | | |
|---|---|---|---|---|---|
| grafting base | 95 | 75 | 60 | 37.5 | 12.5 |
| addition polymerizable monomer including an acrylic acid | 5 | 25 | 40 | 62.5 | 87.5 |
| 2-butoxy-ethanol-1 | 30.4 | 24 | 24 | 24 | 24 |
| n-butanol | 45.6 | 36 | 36 | 36 | 36 |
| dimethyl ethanol amine (ionizing agent) | 7.6 | 6 | 6 | 6 | 6 |
| demineralized water | 310 | 245 | 245 | 245 | 245 |
| Total | 493.6 | 411 | 411 | 411 | 411 |

The Table 2 compositions describe dispersions of neutralized, ionized, acid-functional graft polymer resinous reaction products. Base-functional resinous reaction products can be made in similar fashion, by substituting an unsaturated amine for the unsaturated acid in the monomer, during the grafting step, and by using an acid or a quaternizing agent, or a mixture of these, for ionization.

To make a dispersion useful in the preparation of a sprayable can coating composition from a Step 4 product, the film-forming resinous solids should be derived from an initial reactant epoxy resin in an amount of at least about 50% by weight of the solids, and preferably about 60%, and the epoxy resin should have an EEW of at least 2,000. In terms of the grafting base, the grafting base could contain, for example, at least about 60% by weight of solids derived from or contributed by the epoxy resin based on total solids; the epoxy resin should have an EEW of at least 2,000 (and a molecular weight of at least 4,000); and the grafting base should contribute at least about 78% by weight of the solids present in the final product.

For example, if the can coating is to be based on at least 40% epoxy, which is considered the minimum level for producing acceptable properties, then if the grafting base is to contribute 80% of the solids of the coating, it must initially contain 50% by weight of epoxy resin. Similarly, if the can coating is to be based on at least 45% epoxy, a more preferred level, then the grafting base must initially contain about 56% by weight of epoxy resin.

Step Five

Vinyl Polymerizaton In Situ

Additional monomer is added to the dispersion produced by the previous steps, together with additional initiator, and the temperature is then raised to a suitable reaction temperature while the mixture is agitated, to cause in situ polymerization of the added monomer to occur. Generally more deionized water is also added.

Since the end product of this step is an aqueous dispersion containing added solids, the extent and degree or strength of ionization already present in the dispersion will be important factors in determining both the amount and the identity of the monomer component employed in this fifth step. Thus, if sufficient ionization is present to establish and maintain dispersed the solids to be added, then there need not be additional ionizable sites added, and the monomer component may be a material such as styrene, selected for the properties that it will impart and for its economy. On the other hand, if additional ionizable sites must be introduced, then the monomer component will be selected accordingly.

Additional demineralized water may also be added, so that the material has the requisite characteristics for the kind of application intended. For example, for spraying, a solids content of about 19%–22% by weight is a preferred useful range to employ, although the broader solids concentration of from 10% to 30% by weight is useful. For application techniques other than spraying, a solids content in the range from about 10% to about 40% or even more is useful. While the use of an aminoplast cross-linker is convenient, the products produced by the present invention are self-cross-linking with heat to a limited extent, if terminal epoxy groups are present.

The dispersions that are produced in accordance with the present invention are generally useful as film-forming, surface coating materials, the preferred application being in the formulation of sprayable compositions for coating beverage cans.

The chemical system present in the dispersion products of the present invention is a rather complicated one. Indications are that after the in situ vinyl polymerization of step five, some additional grafting may occur, when the initiator is one that abstracts hydrogen. Complete, accurate characterization of the solids present will require a good deal of work, due to the complexity of the processes and the ingredients.

There are many advantages to modifying the dispersed reaction product of the fourth step by supplementing its solids content through the in situ vinyl polymerization. One obvious advantage is economy, since generally, the material that is added is less expensive than the epoxy component. In addition, the amount of organic solvent as a percentage of the final product is substantially reduced, through the addition of more solids and more water. Another important advantage is that the in situ polymerization can be carried out in the same reaction vessel in which the graft polymer-containing resinous reaction product is produced, and therefore does not require additional equipment, and in fact, makes more efficient use of existing equipment.

Based upon 100 parts of resinous reaction product solids as input for the in situ polymerization, about 10 parts to 225 parts of added vinyl monomer represents a feasible range of addition. However, a greater amount may be added if desired, if appropriate steps are taken to compensate for the changed characteristics of the product, having in mind the intended end use. On the other hand, there is little point in going through this step unless a significant amount of monomer is added to the solids already present. While a practical minimum is about 10 parts of added monomer for each 100 parts of input solids, as little can be added as desired. One presently preferred practical range of addition is from about 12 parts to about 70 parts added per 100 parts of input resinous reaction product solids, for most coating compositions.

In practice, a sufficient amount of monomer is added so that the solids added contribute from about 10% to about 40% and preferably, about one-third of the total solids in the final product. This can often offer a material advantage in respect of economic considerations without substantial loss in functional properties, for example for sanitary (can) coatings produced in accordance with one preferred embodiment of the invention, as hereafter described.

For can coatings the amount of solids added at this stage will tend to be governed by a balance of properties against cost. For good properties, the epoxy resin should contribute at least 30% of total solids, preferably 40%, and more preferably, about 45% to 50%, and this factor, together with the amount and nature of other solids already present, governs what and how much can be added in this step.

In a variation, the resinous reaction product containing the graft polymers may be prepared utilizing an amine, so that the graft polymers and, depending on the process employed, the ungrafted addition polymer also, may be base-functional. In this case, dispersion in water is accomplished by the addition of an agent that ionizes the amine groups. The resulting dispersion is then useful for the in situ vinyl polymerization step, and in this case, the added monomer should produce either nonionic products or base-functional products.

Useful vinyl monomers for this step include vinylidene chloride; arylalkenes, such as styrene, vinyl toluene, alpha-methyl styrene, dichlorostyrene, and the like; C-1 to C-15 alkyl acrylate esters, and particularly, lower alkyl acrylates, such as methyl acrylate, butyl acrylate, and lower alkyl methacrylates, such as methyl methacrylate, butyl methacrylate, and, as well, the nonyl, decyl, lauryl, isobornyl, 2-ethyl hexyl, and octyl esters of acrylic or methacrylic acid, also trimethylol-propane trimethacrylat 1,6-hexanediol dimethacrylate, and the like; hydroxy lower alkyl acrylates, such as hydroxy propyl acrylate, hydroxy ethyl acrylate, and the like; hydroxy lower alkyl methacrylates, such as hydroxy ethyl methacrylate, hydroxy propyl methacrylate, and the like; lower alkenyl carboxylic acids, such as acrylic acid, methacrylic acid, and the like; lower alkenyl amide, such as acrylamide, methacrylamide, isobutoxymethylacrylamide, and the like; lower hydroxyalkyl alkenyl amides such as hydroxy methyl acrylamide, and the like; lower alkyl butenedioates such as dibutyl maleate, dibutyl fumarate, and the like; vinyl lower alkenoates, such as vinyl acetate, and vinyl propionate, and the like; and mixtures of these.

Presently preferred vinyl monomers include styrene, butyl or ethyl acrylate, and methacrylic acid, admixed, with a very small proportion present of the acrylate ester. Up to about 25% allyl materials by weight of total vinyl monomer may be included.

In order to cause the vinyl monomer to polymerize, at least one initiator is introduced into the aqueous dispersion before or during addition thereto, with agitation, of the vinyl monomer. As used herein, the term "initiator" or "free radical initiator" has reference to any substance which when added appears to promote addition polymerization. The amount of initiator used typically is in the range from about 0.1 to 5 parts per 100 parts by weight of total vinyl monomer added, and preferably from about 0.5 to 3 parts per 100 parts total vinyl monomer, but larger or smaller amounts may be used.

Initiation provided by a redox system is extremely effective. An organic peroxide may be used or an inorganic peroxide such as hydrogen peroxide, ammonium persulfate, sodium persulfate, or potassium persulfate. The peroxide catalyst is effectively coupled with a reducing agent such as an alkali metal sulfite, bisulfite, or metabisulfite, or hydrosulfite, or hydrazine. The action of the redox system may be controlled through the use of a chain transfer agent or regulator, such as mercaptoethanol or other mercaptan. Such a regulator also finds use outside of redox systems with organic or inorganic peroxides and with azo catalysts, such as azodiisobutyronitrile, azodiisobutyramide, or diethyl azodiisobutyrate. Examples of other suitable azo catalysts include dimethyl or dibutyl azodiisobutyrate, azobis ($\alpha,\gamma$-dimethylvaleronitrile), azobis ($\alpha$-methylbutyronitrile), azobis ($\alpha$-methylvaleronitrile), dimethyl or diethyl azobismethylvalerate, and the like.

Preferred such initiators comprise the persulfates, such as potassium persulfate, sodium persulfate, ammonium persulfate, and the like. Another useful class of initiators comprises percarbonates, such as diisopropyl percarbonate, and the like.

Another useful but less preferred class of initiators for this in situ polymerization comprises organic peroxides. One group of suitable peroxides comprises diacyl peroxides, such as benzoyl peroxide, lauroyl peroxide, acetyl peroxide, caproyl peroxide, butyl perbenzoate, 2,4-dichloro benzoyl peroxide, p-chlorobenzoyl peroxide, and the like. Another group comprises ketone proxides, such as methyl ethyl ketone peroxide and the like. Another group comprises alkyl hydroperoxides such as -butyl hydroperoxide, and the like. Another group comprises aqueous hydrogen peroxides.

Generally, the initiator is chosen with a half life such that an effective amount is present during the polymerization to insure complete reaction. The preferred initiators are those which are virtually completely consumed when the polymerization is complete.

Certain other classes of materials can be present at the time of, or during such a polymerization, such as chain transfer agents such as n-octylmercaptan, and t-dodecyl mercaptan; reducing agents, such as sodium bisulfite, sodium formaldehyde sulfoxylate, sodium hydrosulfite, and sodium thiosulfate, and the like agents. The amount of such agents or additives if such as used is characteristically less than about five weight percent based on total solids present in a reaction system. Such additives are known to those skilled in the art of vinyl monomer polymerization.

In general, in situ polymerization of the vinyl monomer in accordance with the teachings of this invention permits wide flexibility as to the kinds of initiator employed and the reaction temperature. It generally proceeds under liquid phase conditions at temperatures in the range from about 25° C. to 100° C., and preferably from 50° C. to 100° C., and most preferably, from about 50° C. to 80° C. When the extender polymer employed exhibits a tendency to gel, those higher temperatures that might favor gelation should be avoided.

Under some circumstances, the use of exceptionally high temperatures may be desired. In such cases, when the epoxy resin has been terminated to reduce the liklihood of desired reactions, the polymerization temperature may be as high as 160° C. The rate of monomer polymerization is controlled not only by temperature, but also by such variables as the amount and type of initiator(s) used, initiator concentration, the concentration and type of other solids present, and by other factors.

The vinyl monomer generally is added gradually or by increments to an aqueous dispersion of the resinous reaction product at a rate such that the exothermic polymerization can be controlled adequately. Under favorable circumstances, such as controllable exotherm, the monomer can be added in bulk, and this technique is generally preferred for the production of dispersions to be used in formulating sanitary coating compositions. However, some of the monomer may be present with the dispersion as a "heel", at the time the remainder of the monomer, plus initiator, is added.

The solids are already dispersed, and any further ionization desired proceeds generally as in Step 4. Thus, for ionizing an in situ acid-functional vinyl polymerizate (and any nonionized but ionizable sites already present in the dispersion), dimethyl ethanolamine is a preferred fugitive ionizing agent. Other fugitive bases that may be employed include di-isopropanolamine, triethanolamine, triisopropanolamine, diethyl ethanolamine, and ammonia.

When the ionizable solids are base-functional, the neutralizing agent employed is an acid, preferably a fugitive acid. A few representative suitable materials are hydrochloric acid, sulfuric acid, phosphoric acid, formic acid, chloroacetic acid, acetic acid, glycolic acid, malic acid, maleic acid, fumaric acid, succinic acid, lactic acid, and the like. Quaternizing agents may also be employed in connection with tertiary amino nitrogens in the molecule. These may include, for example, methyl iodide, dimethyl sulfate, methyl chloride, ethyl chloride, and the like.

For coatings that will be in contact with edibles, toxic materials should be avoided.

The product of this fifth step is a dispersion that contains a high proportion of ionized, film-forming, polymeric material. The ionized material consists of the ionized graft polymers, and the ionized ungrafted addition polymer present. The solids in the product are present as an ultrafine dispersion of very fine solid particles in the aqueous vehicle, with the sizes of the particles distributed over a broad range.

If in the third step, a grafting base containing 40 parts of epoxy resin and 40 parts of polystyrene, in solution, is reacted with 20 parts of a monomer mixture consisting of a major amount of methacrylic acid and minor amount of styrene, reacted at about 115° C. to 120° C. and in the presence of about 6.7% BPO, dry basis, then an acid functional resinous reaction product may be obtained that contains a substantial amount of graft polymer, together with ungrafted, ionizable addition polymer, and unreacted grafting base solids comprising unreacted epoxy resin and unreacted extender polymer. If then, 15 to 50 parts of ethylenically unsaturated monomer, such as styrene or styrene plus methacrylic acid and/or ethyl acrylate, are subjected to addition polymerization conditions in the presence of 75 parts by weight of an aqueous dispersion at 22.5% N.V. of this acid functional resinous reaction product, the added ethylenically unsaturated monomer adds to the content of polymer solids present, while much of the functionality of the original dispersion is preserved. The dispersion that would be produced from such an in situ vinyl polymerization would contain about 13.5 parts by weight of solids derived from the grafting base solids, about 3.4 parts of solids derived from the grafting step, and 15 to 50 parts of solids derived from the in situ polymerized ethylenically unsaturated monomer material. Such an aqueous dispersion would be useful in the formulation of wood coatings, clear or pigmented, and could be formulated for any type of application desired, i.e., brushing, rolling, spraying, and the like.

Wide variations in composition are of course possible, for other types of formulations intended for the same or other purposes. Some of the possibilities are summarized briefly in the tabular presentations in Tables 4 and 5 below. In Table 4, it is assumed that 10 parts of solids are added by the in situ vinyl polymerization step.

TABLE 4

Representative Product Compositions (By Weight, Dry Solids Basis), 10 Parts of Solids Added In The in situ Vinyl Polymerization

| Component Providing Source of Solids | Parts | % | Parts | % | Parts | % | Parts | % |
|---|---|---|---|---|---|---|---|---|
| Grafting Base | 95 | 86.4 | 80 | 72.7 | 50 | 45.5 | 30 | 27.3 |
| Third Step Addition Polymerizable Monomer | 5 | 4.5 | 20 | 18.2 | 50 | 45.5 | 70 | 73.6 |
| Fifth Step In Situ Vinyl Polymerization | 10 | 9.1 | 10 | 9.1 | 10 | 9.1 | 10 | 9.1 |
| Total | 110 | 100 | 110 | 100 | 110 | 100 | 110 | 100 |

In Table 5, it is assumed that the added in situ polymerization adds 40% by weight to the solids content of the dispersion.

TABLE 5

Representative Product Compositions (By Weight Dry, Solids Basis) 40% Solids Added by the In Situ Vinyl Polymerization

| Component Providing Source of Solids | Parts | % | Parts | % | Parts | % | Parts | % |
|---|---|---|---|---|---|---|---|---|
| Grafting Base | 95 | 57 | 80 | 48 | 50 | 30 | 30 | 18 |
| Third Step Addition Polymerization Monomer | 5 | 3 | 20 | 12 | 50 | 30 | 70 | 42 |
| Fifth Step In Situ Vinyl Polymerization | 66 | 40 | 66 | 40 | 66 | 40 | 66 | 40 |
| Total | 166 | 100 | 166 | 100 | 166 | 100 | 166 | 100 |

In both tables above, the composition of the grafting base is not specified. It may be selected and adjusted to produce desired final product compositions and properties.

Those compositions having about 40% or more of total solids contributed by the initial epoxy resin component wet and adhere to metal surfaces well, and form good barrier films. The added addition polymerizable monomer improves the weathering and other characteristics of film formed from the composition. Where economy is important, or for application to surfaces other than metal, valuable coating compositions can be prepared with a relatively small contribution from the epoxy resin.

For ease in handling, and for application properties, water may be added during the in situ reaction, so that while the solids are increased by this step in total amount, the solids concentration may remain substantially constant. Obviously, changes in the amount, proportions, or nature of the materials employed in this step will affect the composition and properties of the final product.

For general types of applications including spraying, the aqueous dispersion may comprise, preferably, from about 10% to 40% solids, which are proportioned as follows: about 0.1% to about 16% by weight of a cross-linking agent, and about 6% to about 39.9% by weight of the solids from a reaction mixture produced in accordance with the present invention; and about 60% to about 90% volatile components, generally divided into about 6% to about 35% organic solvent, and about 25% to about 80% water. It is preferred but not essential that some organic solvent be used to facilitate application, and it is generally used in the ratio of one part by weight of solvent to about three parts by weight of water.

The resulting aqueous coating composition can be applied satisfactorily by any conventional method known in the coating industry. Thus, spraying, rolling, dipping, flow coating or electrodeposition applications can be used for both clear and pigmented films. Often spraying is preferred. After application onto a metal substrate, the coating is cured thermally at temperatures in the range from about 95° C. to about 235° C. or higher, for periods in the range from about 1 to about 20 minutes, such time being sufficient to effect curing as well as volatilization of any fugitive component therein. Further, films may be air dried at ambient temperatures for longer periods of time.

If desired, some or even all of the organic solvent present can be completely removed prior to final formulation, by vacuum evaporation (distillation) at a moderate temperature. If this is done, the solvent content of the final product may be as low as is desired, including zero. This can be done for can coating dispersions or for other applications if desired. If it is to be done, the solvents selected for use in the process must have boiling points below that of water.

Sprayable Coating Compositions

Since sprayable compositions are preferred and important embodiments of the invention, they are treated separately in this section.

The amount of water in the final product dispersion depends on the viscosity desired, which, in turn, is related to the intended method of application. For spraying, water amounting to about 60% by weight of the dispersion represents a typical level, within a preferred range of composition for the dispersion of from 10% to 30% by weight of solids and from about 70% to 90% of volatiles, that is, fugitive base, water, and solvents. The fugitive base is usually about from 2% to 6%, water from about 30% to 90% and the organic solvents from about 5% to about 40%, all percentages being by weight based on the sprayable dispersion. The solids comprise about 9% to 29% of the reaction mixture solids, and about 1% to 10% of a crosslinking agent, based on the sprayable dispersion.

The organic solvent can be made up of one or more of the known solvents such as butanol (normal), 2-butoxy-ethanol-1, xylene, toluene, and other solvents. It is preferred to use n-butanol in combination with 2-butoxy-ethanol-1, in approximately equal amounts. A representative OS/S ratio for a sprayable can coating is about 0.5.

An aminoplast resin is preferred for use as the cross-linking agent. It can be added before any final diluting, or thereafter. Typical aminoplasts include melamine, benzoguanamine, acetoguanamine, and urea resins such as urea formaldehyde. Commercially available aminoplasts which are water soluble or water dispersible and useful for the instant purpose include Cymel 301, Cymel 303, Cymel 370, and Cymel 373 (all being products of American Cyanamid, Stamford, Conn., said aminoplasts being melamine based, e.g., hexamethoxymethyl melamine for Cymel 301), and Beetle 80 aminoplasts (products of American Cyanamid which are methylated or butylated ureas.)

Other suitable aminoplast resins are of the type produced by the reaction of aldehyde and formoguanamine; ammeline; 2-chloro-4,6-diamine-1,3,5-triazine; 2-phenyl-p-oxy-4,6-diamino-1,3,5-triazine; and 2,4,6-triethyl-triamino-1,3,5-triazine. The mono-, di-, or tri-aryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

If there is little or no oxirane functionality in the final product, then a cross-linker is necessary; otherwise, it is desirable but the product is self cross-linking to some extent with heat.

Another way to introduce cross-linking capability into the reaction mixture and the graft polymer is by utilizing as all or part of the polymerizable monomer, in the initial reaction mixture, a material such as acrylamide or an alkyl derivative thereof, or a material such as bis maleimide.

The coating composition of the present invention can be pigmented and/or opacified with known pigments and opacifiers. For many uses, including food uses, the preferred pigment is titanium dioxide. Often the pigment is used in a pigment-to-binder ratio of 0.1:1 to 1:1, by weight. Titanium dioxide pigment can be incorporated into the composition in amounts in a preferred range of from about 5% to 40% by weight, based on resinous, film-forming solids in the composition. Dyes may also be used, alone or in conjunction with pigment.

For metal sheet substrates intended as beverage containers and particularly for carbonated beverages such as beer, the coating should be applied at a rate in the range from about 0.5 to about 15 milligrams of binder solids per square inch of exposed metal surface. To attain the foregoing, the water-dispersible coating as applied can be as thick as 1/10th mil. to about 1 mil.

Sprayable can coating compositions prepared in accordance with the present invention are generally highly resistant to blistering and are well suited for their intended purpose.

General

The properties of the fifth step product can be substantially custom produced. The strength and degree of ionization in the product can be such that the particles remain in stable suspension almost indefinitely under room temperature storage conditions, without agitation. The ionized material from the reaction product of the third, grafting step appears to play a role in causing the in situ polymerization to result in a product in which all of the particles remain dispersed, whether they themselves are ionizable or not.

It is possible to employ an external surfactant during the in situ polymerization. The use of an external surfactant appears to be possibly valuable for improving the coverage of coatings prepared from the in situ polymerizate. A wide variety of commercially available external surfactants is available for use. Anionic agents such as Tamol 731 of Rohm and Haas and Daxad 30 of W. R. Grace are exemplary. Other satisfactory external surfactants include Aerosol MA, a product of American Cyanamid, available as an 80% solution in water to tetra sodium N-(1,2-dicarboxyethyl-N-octadecyl-sulfosuccinamate), and Aerosol 22, another product of American Cyanamid, available as a 35% solution in water of sodium dihexyl sulfosuccinate. Combinations of two or more external surfactants may also be used.

The introduction of a wetting agent as an external surfactant may affect blush resistance, particularly at baking temperatures below 375° F. (191° C.). The addition of a cross-linker such as Cymel 303, however, apparently improves the situation.

The amount of solvent and water present in the fourth (dispersion) step product should be kept at a level that facilitates handling. Preferably, the solvent system used is a water-miscible system. Epoxy resins are generally soluble in ketones, ethers, and esters. Solvents that may be used are n-propyl ketone, methyl isobutyl ketone, diisobutyl ether, n-propyl acetate, n-butyl acetate, ethyl butyrate, an alkoxyethanol, or an alkyl ether of diethylene glycol. The preferred solvent is 2-butoxy-ethanol-1.

Preferably, in addition to a solvent for the epoxy resin, a second organic liquid solvent is present that need not necessarily dissolve the epoxy resin itself, but that is preferably miscible with the first solvent, and that preferably can dissolve or solvate the side chains on the backbone resin in the graft polymer and the addition polymer, that is associatively formed with the graft polymer, in the third step as well. The preferred second solvent is n-butanol.

One very important purpose of the solvent(s) is to facilitate handling during the several process steps. The extender polymer preferably is selected for solubility in the solvent system used.

From the standpoints of ease of handling, and workability, a 40% concentration of solids in any product may be workable, depending on its constitution, but a product at even 35% solids is very thick. Accordingly, it will often be found convenient to produce product at 20% to 30% solids content. The preferred dispersions are opalescent in appearance.

The epoxy resins employed in the practice of the invention have been identified primarily in terms of desired molecular weight and/or EEW. They are more specifically identified in the earlier applications mentioned above. Dow Chemical's D.E.R. 331 epoxy resin is a preferred low molecular weight starting resin, but its EEW is preferably advanced to about 4,000 or so for use. Comparable, commercially available epoxy resins can be advanced to a useful EEW with a catalyst such as sodium or potassium acetate or similar alkaline material. Since some resins are sold in solvents and/or with residual catalysts, care must be exercised.

Dow's D.E.R. 669 epoxy resin, EEW about 4,500, is useful, as is its D.E.R. 668, EEW about 2,750. Shell's Epon Resin 1010, EEW about 5,000, and its Epon Resin 1009, EEW about 3,250, are also useful; these are solid resins.

The invention will now be further explained by several demonstrations of its practice. Throughout this application and especially in the following examples, all parts and percentages are by weight, and all temperatures are in °C., unless expressly stated to be otherwise.

The epoxy resin molecular weights referred to hereafter are those calculated from end group analysis data.

The first five examples describe the production of grafting base.

GRAFTING BASE PRODUCTION

Example 1

Grafting Base: Epoxy Resin With Polystyrene

The polystyrene extender polymer was first formed as follows: 283 gms. of 2-butoxyethanol-1 was charged into a 5 liter round bottom flask which was fitted with a water-cooled condenser, nitrogen inlet, a stirrer, and a thermometer, heated by an electric heating mantle. The 2-butoxyethanol-1 was heated to about 110° C. and to this heated solvent solution was gradually added a monomer mixture composed of 74 gms. of styrene and 4 gms. of benzoyl peroxide (BPO, 78% in H2O). The addition of monomer took 2 hours then a shot of chaser of 1.4 gms. of BPO (78%) in 10 gms. of 2-butoxyethanol-1 was added to the reaction mixture. After the addition of the chaser, the addition mixture was held for ½ hour and the chaser step was repeated. After the 2nd chaser was added, the polymerization mixture was held for 2 hours. At the end of that time a vacuum was applied to the reaction mixture to remove water.

After the water was removed, 872 gms. of a liquid epoxy resin, Dow DER-333, and 470 gms. of bisphenol A were charged into the reaction flask. The temperature fell to 95° C. and heating was continued. When the temperature was at 140° C., heating was turned off and the exotherm raised the temperature to 151° C. At that time heating was resumed and the temperature reached 180° C. in 5 minutes. The temperature was held at 170° C. for the next 3 hours.

The oxirane value of the reaction mixture was determined at the end of each hour during the 3 hour hold period. These oxirane values were 0.3, 0.26, and 0.24, respectively. The method used for determining oxirane value was that described in the issued patents and published applications identified in the discussion above of related patent applications. At the end of the 3 hour hold period, 254 gms. of 2-butoxyethanol-1 was added, followed by 889 gms. of n-butanol.

The product was a solution of a fluent, filterable mixture of epoxy resin with polystyrene, having the approximate composition of Grafting Base 1-1 of Table 1A above. It is generally useful as a material for grafting as in Step 3 of the process of this invention, and as will be specifically described presently.

Example 2

Grafting Base: Epoxy Resin With Polybutene

In this demonstration of grafting base production, the extender polymer, polybutene, is a preformed, commercially available polymer.

1141 gms. of a liquid epoxy resin, Dow DER-333, 614 gms. of bisphenol A, 310 gms. of 2-butoxyethanol-1, and 435 gms. of polybutene 24 (from Chevron Chemical Co., California), were charged into a 5 liter round bottom flask equipped with N2 inlet, condenser, stirrer and a thermometer. The reaction mixture was heated to 140° C., where a small exotherm occurred. Heating was resumed until the batch temperature increased to 175° C. The batch was then held at 175° C. for 3 hours. The viscosity of the resin was observed at the end of each hour hold, measured in 2-butoxy-ethanol-1 at 40% NV, with the values R, S, and S, respectively. At the end of the third hour hold, 996 gms. of n-butanol were added to the reaction mixture, and the temperature was then stabilized to 112° C.

The product was a filterable solution of a mixture of epoxy resin with polybutene, having approximately the composition of grafting base 2-3 of Table 1A above. It also is generally useful as a material for grafting, as in Step 3 of the process of this invention.

Example 3

Grafting Base: Epoxy Resin with Epoxidized Polybutadiene

Into a 5-liter round bottom flask equipped with nitrogen inlet, water-cooled condenser, mechanical agitator and a thermometer was charged 1085 gm. of liquid epoxy resin (Epon 828), 614 gm. of bisphenol A, 57 gm. of xylene, 100 gm. of epoxidized polybutadiene (Mn 700-800, oxirane oxygen content 7.5%), and 310 gm. of 2-butoxy-ethanol-1.

The reaction mixture was heated to 50° C. under a nitrogen sparge, and 0.5 gm. of sodium acetate trihydrate in 9 gm. of water was added to the reaction mixture. At that time, the nitrogen was turned off, a vacuum of 17" was applied and heating continued.

When the temperature reached 135° C., the vacuum was turned off and replaced by the nitrogen sparge. 25.5 gm. of liquid was collected. There was an exotherm observed at 140°-150° C., and the temperature climbed to 180° C., where it was maintained. After 3 hours at that temperature, the viscosity of the batch was X-(the cut was made by taking 10 gm. of the reaction mixture with 11.25 gm. of 2-butoxy-ethanol-1). At that time, heating was discontinued and 1200 gm. of n-butanol was carefully added.

The product was a fluent, filterable mixture of an oxirane-terminated epoxy resin with epoxidized polybutadiene, having the composition of Grafting Base 1-4 of Table 1A above. It is generally useful as a material for grafting as in Step 3 of the process of this invention, as will be described presently.

Generally, the extender polymer is one that is substantially inert both to the epoxy resin and to the polyfunctional advancing agent, under the conditions of advancement. However, as this example demonstrates, it is feasible to use an extender polymer that is merely of lesser reactivity to the advancing agent than is the epoxy resin, and that is substantially non-reactive with the epoxy resin itself under the conditions of advancement.

Example 4

Grafting Base: Epoxy Resin with Coumarone-Indene Resin

Into a 5-liter round bottom flask was charged 1085 gm. of liquid epoxy resin (Epon 828), 614 gm. of bisphenol A, 57 gm. of xylene, 300 gm. of coumaron-indene resin (Cumar-R-1 from Neville Chemical Co., Mn 730) and 421 gm. of 2-butoxy-ethanol-1. The flask was fitted with a water-cooled condenser, N2 inlet, mechanical stirrer and a thermometer.

The mixture was heated under N2 sparge and at 80° C., a solution of 0.8 gm. of sodium acetate in 9 gm. of water was added to the reaction mixture. At that time, a vacuum of 18 inches was applied to the flask and heating continued. When the temperature reached 140° C., heating was stopped and the vacuum was turned off. 33 gm. of liquid was collected in the vacuum trap. There was a slight exotherm as the temperature increased to 150° C., at which time heating was resumed. The temperature was stabilized at 175° C. for 4 hours. At the end of that time, the viscosity of the reaction mixture was U (viscosity sample prepared at 40% NV in 2-butoxy-ethanol-1). Heating was stopped and 1089 gm. of n-butanol was added.

The product was a fluent and filterable mixture of oxirane-terminated epoxy resin with coumarone-indene resin, having the composition of Grafting Base 1-5 of Table 1A above. It is generally useful as a Step 3 grafting base.

EXAMPLE 5

Grafting Base: Epoxy Resin with Polybutadiene Resin

Into a 5-liter round bottom flask was charged 1085 gm. of liquid epoxy resin (Epon 828), 614 gm. of bisphenol A, 57 gm. of xylene, 300 gm. of the polybutadiene and 421 gm. of 2-butoxy-ethanol-1. The mixture was heated to 80° C. under nitrogen sparge and 0.8 gm. of sodium acetate trihydrate in 9 gm. of water was added. A vacuum of 20" was then applied to the reaction mixture and heating continued.

At 140° C., the vacuum was broken off and heating topped. 41.5 gm. of liquid was collected in the vacuum trap. Heating was continued, until the temperature reached 175° C. At that time the temperature was stabilized for 3 hours. At the end of that time, the viscosity of the resin mixture was V-(40% NV in 2-butoxy-ethanol-1). 1039 gm. of n-butanol was then added and temperature was stabilized at 115° C.

The product was a fluent and filterable mixture having the composition of Grafting Base 6-1 of Table 3 above. It is generally useful as a Step 3 grafting base.

The Grafting and Dispersion Steps

Example 6

Acid Functional Resinous Reaction Product From Grafting Base 1-1

The grafting base of Ex. 1 was utilized. A monomer mixture was made up of:

| Ingredient | Grams |
| --- | --- |
| methacrylic acid | 299 |
| styrene | 95 |
| ethyl acrylate | 4 |
| benzoyl peroxide (moist; 78% active) | 35 |
| 2-butoxyethanol-1 | 101 |

This mixture was slowly added, over a two hour period, to the grafting base, while maintaining the temperature at about 118° C. 57 gms. of n-butanol was then added and the reaction mixture was held at 110° C. for 3 hours.

3,188 grams of the solution thus obtained, a graft polymer-containing resinous reaction product (58.1% N.V., AN 85), was added to a mixture of 3,862 grams of deionized (DI) water, 229 grams of 2-butoxyethanol-1, and 181 grams of dimethylethanol amine. A dispersion formed with the following characteristics:

NV = 25.44% (30 min. @ 400° F.)
Viscosity = 100 secs., #4 Ford cup at 25°
AN (acid number) = 85.3 on NV
BN (base number) = 62.8 on NV
% neutralization = 72%

This dispersion is useful in its own right. It can be formulated with pigment and a cross-linker, to make a sprayable can coating composition. It is also useful as a medium for in situ vinyl polymerization, as will be described presently.

Example 7
Acid Functional Resinous Reaction Product from Grafting Base 2-3

The temperature of the grafting base solution of Ex. 2 was adjusted to about 112° C. A monomer mixture of 283 gms. methacrylic acid, 148 gms. styrene, 4 gms. of ethyl acrylate, 38.5 gms. benzoyl peroxide (BPO 78% in water), and 111 gms. of 2-butoxyethanol-1 was slowly added to the grafting base. The addition of this monomer mixture took 2 hours. At the end of the monomer addition, 255 gms. of n-butanol was added, and the reaction mixture was then held at 112° C. for 3 hours. At the end of the 3 hour hold, the graft polymer resinous reaction product was ready to be dispersed in water. The resin viscosity was then K, as measured by dissolving 1 part of the resin solution in 1 part n-methyl pyrrolidone.

2,752 gms. of the graft polymer solution was slowly dropped into a aqueous mixture composed of 3,971 gms. of deionized water and 135 gms. of dimethyl ethanolamine. The dispersion had much opalescent color, an indication of rather small particle size. The constants for the aqueous dispersion were:
NV = 24.4%
AN = 73.3
BN = 50.1
Viscosity = 22 secs. #4 Ford Cup
Organic solvent/solids (OS/S) = 0.77

This dispersion product was also useful per se. When formulated with an aminoplast it makes an excellent clear protective coating, particularly useful for metal surfaces. It can be cured by air drying but preferably is cured by baking.

Example 8
Acid-Functional Resinous Reaction Product From Grafting Base 1-4

The temperature of the grafting base solution of Ex. 3 was adjusted to 110° C. A monomer mixture composed of the following was then dropwise added:

| methacrylic acid | 283 gm. |
| styrene | 148 gm. |
| ethyl acrylate | 4 gm. |
| benzoyl peroxide (78% in H₂O) | 38.5 gm. |
| n-butanol | 111 gm. |

The addition took 2 hours, and then 62 gm. of n-butanol was added. The reaction mixture was then held for 3 hours.

At the end of that time, the Gardner viscosity of the reaction mixture (1 pt. resin, 1 pt. N-methyl pyrrolidone) was I.

2705 gm. of the reaction mixture was slowly dropped into 3411 gm. of deionized water and 152 gm. of dimethylethanolamine. The temperature of the water was about 50° C. At the end of the drop, the temperature of the dispersion rose to 75° C. 560 gm. of deionized water was then added to the dispersion.

The resulting dispersion had the following characteristics:

NV: 24.2%
OS/S: 0.87 The ratio of epoxy:epoxidized polybutadiene:acrylic was 76:4.5:19.5.

Example 9
Acid-Functional Resinous Reaction Product From Grafting Base 1-5

The temperature of the grafting base reaction mixture of Ex. 4 was stabilized at 112° C. A monomer mixture was prepared from the following:

| methacrylic acid | 283 gm. |
| styrene | 148 gm. |
| ethyl acrylate | 4 gm. |
| benzoyl peroxide (78% in H₂O) | 38.5 gm. |
| n-butanol | 111 gm. |

This mixture was added slowly to the grafting base over a period of 2 hours while keeping the temperature at least as high as 112° C. After then adding 63 gm. of n-butanol, the reaction mixture was held at 110° C. for 3 hours.

A stainless steel vessel was then loaded with 3,411 gm. of deionized (DI) water and 152 gm. of dimethyl ethanolamine. Then 2,711 gm. of the reaction mixture was slowly dropped into the vessel, while mixing with a high lift mechanical agitator. A dispersion formed easily. At the end of the drop, 560 gm. of deionized water was added.

The constants for the dispersion are:
NV: 24.6%
OS/S: 0.8
The ratio of epoxy:Cumar-R-1:acrylic was 70:12:18.
The ratio of butanol:2-butoxy-ethanol-1 was 75:25.

Example 10
Acid-Functional Resinous Reaction Product From Grafting Base 2-1

A monomer mix was prepared from the following:

| methacrylic acid | 283 gm. |
| styrene | 148 gm. |
| ethyl acrylate | 4 gm. |
| benzoyl peroxide (78% in water) | 38.5 gm. |
| n-butanol | 111 gm. |

While the grafting base 2-1 from Ex. 5 was maintained at about 115° C., the monomer mix was slowly added over a 2 hour period. At the end of the monomer addition, 63 gm. of n-butanol was added and the reaction mixture was held for 3 hours at 112° C.

Into 3411 gm. of deionized water (50° C.) and 152 gm. of dimethylethanolamine, 2,777 gm. of the resin mixture was slowly dropped. The dispersion formed easily and the constants of the dispersion are similar to those of the previous example.

Summary of Examples 6-10

The dispersions of Exs. 6-10 are each useful per se, and can be formulated with pigment solids, cross-linker, and other adjuvants to make valuable coating compositions.

The resinous, film-forming solids in the dispersions of Examples 6 through 10 have the compositions tabulated in Table 6 below.

TABLE 6

Step 4 Dispersion Products: Composition of Solids

Percentage by Weight

| Component | Ex. 6 | Ex. 7 | Ex. 8 | Ex. 9 | Ex. 10 |
|---|---|---|---|---|---|
| Epoxy Resin | 74 | 67 | 76 | 70 | 70 |
| Extender polymer: | | | | | |
| Polystyrene | 4 | — | — | — | — |
| Polybutene | — | 16.5 | — | — | — |
| Epoxidized polybutadiene | — | — | 4.5 | — | — |
| Coumarone-indene | — | — | — | 12 | — |
| Polybutadiene | — | — | — | — | 12 |
| Acrylic | 22 | 16.5 | 19.5 | 18 | 18 |

Each of these dispersions contains sufficient epoxy resin for excellent adhesion to metal surfaces, and for the production of films having good chemical inertness and hence good barrier properties. Moreover, the balance of properties and the composition of each is such as to permit the formulation of a sprayable sanitary coating composition with excellent storage stability, good application properties, and outstanding cured characteristics.

The amount of acrylic acid present is important since it imparts acid functionality and hence ionizability. The respective amounts of methacrylic acid (MAA) and of carboxyl group (COOH) are listed in Table 7 below.

TABLE 7

Step 4 Dispersion Products: Methacrylic Acid and Carboxyl Components Percentage by Weight of Total Resinous Solids

| | Ex. 6 | Ex. 7 | Ex. 8 | Ex. 9 | Ex. 10 |
|---|---|---|---|---|---|
| MAA | 16.5 | 10.7 | 12.7 | 11.7 | 11.7 |
| Carboxyl | 8.6 | 5.6 | 6.6 | 6.1 | 6.1 |

THE IN SITU POLYMERIZATION STEP

Example 11

Sprayable Can Coating Composition
Epoxy:Polystyrene:Acrylic

The dispersion of Ex. 6 was used for this demonstration of in situ vinyl (acrylic) polymerization for increasing the solids content.

2400 gms. of the dispersion, 174 gms. of styrene, 26 gms. of methacrylic acid, and 573 gms. of water were charged into a 5 liter round bottom flask equipped with a stirrer, $N_2$ inlet, thermometer and a condenser. To this reaction mixture was added 1.1 gms. of sodium formaldehyde sulfoxylate in 10 gms. of DI water.

The reaction mixture was heated to 50° C., and then 1.1 gms. of t-butyl hydroperoxide (t-BHP) (90% in water) in 10 gms. of DI water was added. The temperature was then raised to 80° C., and at that temperature the reactants were held for 1 hour. At the end of the 1 hour hold, 0.5 gms. of sodium formaldehyde sulfoxylate in 5 gms. of DI H2O, and 0.5 gms. of t-BHP in 5 gms. of water were added and held at 81° C. for ½ hour. At that time another shot of chaser (0.5 gms. of sodium formaldehyde sulfoxylate in 5 gms. of water and 0.5 gms. of t-BHP in of water) was added, and the mixture was held for 1½ hours at 81° C. At the end of ½ hour, the non-volatiles were determined to be 24.06%. At the end of 1½ hours, the non-volatiles were determined to be 24.17%. 783 gms. of DI water was then added.

The final constants for this material were:
NV=19.25 (30 min. 400° F.)
Viscosity=10 secs. #4 Ford dup
AN=88.2 on NV
BN=50.3 on NV
% neutralization=57%

The solids in this product are derived from the following sources, the numbers representing proportions by weight:

| epoxy resin | 56 |
|---|---|
| polystyrene extender polymer monomer: | 3 |
| added during grafting | 16 |
| added during in situ polymerization | 25 |
| Total Monomer | 41 |
| Total | 100 |

In ratio form, the solids composition can be described as: epoxy:polystyrene:acrylic=56:3:41.

This dispersion can be formulated with Cymel 303 aminoplast, up to about 10% based on the dispersion, to form a sprayable, curable, clear can coating. The coating can be opacified if desired, by the addition of from about 1% to about 1.9% by weight of the dispersion of pigment grade titanium dioxide.

Example 12

Sprayable Protective Coating;
Epoxy:Polybutene:Acrylic

The dispersion of Ex. 7 was used as the vehicle for this demonstration of in situ polymerization for solids augmentation.

2242 gms. of the dispersion, 800 gms. of DI water, 330 gms. of styrene, and 50 gms. of methacrylic acid were charged into a 5 liter round bottom flask, and heated to 50° C. 4 gms. of sodium formaldehyde sulfoxylate in 40 gms. of DI water was then added to the reaction mixture, followed by 4.4 gms. of t-butyl hydroperoxide (t-BHP) (90% in water) in 40 gms. of DI water. The reaction temperature was then raised to 75° C. and held at that temperature for 2 hours. At the end of the 2 hour hold, a chaser composed of 2 gms. of sodium formaldehyde sulfoxylate in 20 gms. of water and 2.2 gms. of t-BHP in 20 gms. of water was added, and the reaction mixture was held for 1 hour at 75° C. At the end of that time the chaser step was repeated. After another hour on hold, 36 gms. of dimethyl ethanolamine and 32 gms. of water were added and held for another hour at 75° C. The constants for the final material were:
NV=25.1%
AN=79.5
BN=51.4
Viscosity=15 secs. #4 Ford cup
OS/S=0.48
Epoxy:polybutene:acrylic=39:10:51

This dispersion can be formulated with pigment solids and a cross-linker to form coating compositions that are useful for general purpose protective and decorative coatings.

Example 13

Sprayable Coating Composition; Epoxy:Epoxidized Polybutadiene:Acrylic

The dispersion of Example 8 was used as the vehicle for this in situ polymerization.

2260 gm. of the dispersion and 1200 gm. of deionized water were charged into a 5-liter round bottom flask equipped with a nitrogen inlet, condenser, thermometer and mechanical agitator. The mixture was heated to 50° C. and a mixture of 330 gm. of styrene and 50 gm. of methacrylic acid was slowly added to the dispersion over a period of 1 hour.

After the monomer addition, 4 gm. of sodium sulfoxylate formaldehyde in 40 gm. of water, and 4.4 gm. of t-BHP (90% in water) in 40 gm. of water, were added, and the temperature raised to 71° C. The temperature was held at 71° C. for 2 hours, and a chaser of 2 gm. of sodium sulfoxylate formaldehyde in 20 gm. of water, and 2.2 gm. t-BHP in 20 gm. of water, was added. The reaction was held another hour at 71° C. At the end of that time, the chaser step was repeated. 36 gm. of dimethyl ethanolamine in 32 gm. of deionized water was then added and held another hour. 100 gm. of n-butanol and 35 gm. of dimethylethanolamine were added.

The resulting dispersion had the following constants:

| | |
|---|---|
| NV | 21.4% |
| Viscosity | 355 sec. #4 Ford Cup |
| AN | 83.6 |
| BN | 88.6 |
| % neutralization | 105% |
| OS/S | 0.68 |

Example 14

Coating Composition; Epoxy:Coumarone-Indene:Acrylic

The dispersion of Ex. 9 was augmented in solids content, and its percentage of organic solvent reduced, by the following operation.

2383 gm. of the dispersion from Ex. 9 and 1000 gm. of deionized water were charged into a 5-liter round bottom flask. The mixture was then heated to 50° C. under agitation with a nitrogen sparge. A monomer mix consisted of 330 gm. of styrene and 50 gm. of methacrylic acid was added to the reaction mixture over an hour, followed by 4 gm. of sodium sulfoxylate formaldehyde in 40 gm. of water and 4.4 gm. of t-BHP (90% in water) in 40 gm. of water.

The temperature was raised to 76° C., at which temperature, the reaction mixture was held for 2 hours. At the end of the 2 hour hold, a chaser of 2 gm. of the sodium sulfoxylate formaldehyde in 20 gm. of water and 2.2 gm. of t-BHP (90% in water) in 20 gm. of water was added. The reaction was held for another hour at 76° C. and the chaser step repeated. 36 gm. of dimethylethanolamine and 32 gm. of deionized water were added and the reaction mixture held for another hour.

The final dispersion has the following constants:

| | |
|---|---|
| NV | 21.6 |
| Viscosity | 14 secs. (#4 Ford Cup) |
| AN | 88.7 |
| BN | 74.1 |
| % neutralization | 83.5 |
| OS/S | 0.54 |

The proportion of epoxy to coumarone-indene to acrylic were about 41:7:52. This dispersion was readily formulated into protective coatings that were particularly useful for metal surfaces. It could also be used directly for clear coatings, but more desirable application and decorative properties were obtained by formulation with added water and pigment solids, and preferably, an aminoplast cross-linker.

Example 15

Coating Composition:Epoxy:Polybutadiene:Acrylic

The dispersion of Ex. 10 was augmented in solids content, and its percentage of organic solvent reduced, by the following in situ vinyl polymerization.

To 2298 gm. of the dispersion of Ex. 10 was added 1200 gm. of deionized water. The mixture was heated under N2 blanket to 50° C. 330 gm. of styrene and 50 gm. of methacrylic acid were slowly added to the dispersion over a period of an hour, and 4 gm. of sodium sulfoxylate formaldehyde in 40 gm. of water was added followed by 4.4 gm. of t-BHP (90% in water) in 40 gm. of water. The resultant reaction mixture was then heated to 75° C. and held for 2 hours at that temperature. At the end of the hold, a chaser of 2 gm. of sodium sulfoxylate formaldehyde in 20 gm. of water and 2.2 gm. of t-BHP (90% in water) in 20 gm. of water was added, and reaction mixture was held for one hour. At the end of that time, the chaser step was repeated. 36 gm. of dimethylethanolamine and 32 gm. of water was then added and the mixture held for another hour at 75° C.

The dispersion had the following constants:
NV: 23.2%
Viscosity: 27 secs. (#4 Ford Cup)
AN: 80.4
BN: 60.6
% neutralization: 75.3
OS/S: 0.5
Epoxy: acrylic: 41:7:52
n-butanol/2-butoxy-ethanol-1=75/25

The dispersion was useful for the same purposes as the product of Ex. 14.

Summary of Examples 11–15

The resinous, film-forming solids of the dispersions of Examples 11 through 15 have the compositions listed in Table 8 below.

TABLE 8

Step 5 Dispersion Products: Composition of Solids Percentage by Weight of Total Resinous Solids

| Component | Ex. 11 | Ex. 12 | Ex. 13 | Ex. 14 | Ex. 15 |
|---|---|---|---|---|---|
| Epoxy Resin | 56 | 39 | 44.8 | 41 | 41 |
| Extender polymer: | | | | | |
| Polystyrene | 3 | — | — | — | — |
| Polybutene | — | 10 | — | — | — |
| Epoxidized Polybutadiene | — | — | 2.7 | — | — |
| Coumarone-Indene | — | — | — | 7 | — |
| Polybutadiene | — | — | — | — | 7 |
| Acrylic | 41 | 51 | 52.5 | 52 | 52 |
| Total MAA (Approx.) | 20 | 12 | 12.9 | 12.3 | 12.3 |
| Total Carboxyl (Approx.) | 10 | 6 | 6.7 | 6.4 | 6.4 |

ALTERNATE PROCESS

Example 16

The Third Preferred Embodiment

Addition Of Extender Polymer Prior to the In Situ Polymerization

A 100 gallon reactor was charged with the following:
263 lb. of Dow DER-331 liquid epoxy resin
13.8 lb. xylene 149 lbs. of bisphenol A
75 lbs. of 2-butoxyethanol-1

It should be noted that DER-331 resin is essentially the same as the DER-333 resin used in the earlier examples, but lacks a self-contained catalyst and xylene. The appropriate amount of xylene is added above to make this resin have the same xylene content as DER-333 resin.

The mixture was heated to 185° F. and 55.8 gms. of sodium acetate trihydrate in 559 gms. of DI H₂O was added to the reaction mixture. The heating was resumed at a vacuum of 20 inches was applied to the reactor. About ½ hour later, the temperature reached 310° F. At that time the vaccum was disconnected and a nitrogen sparge was inserted. Six lbs. of volatiles were collected at 320° F. The temperature was held at 350° F. for 2 hours. At the end of that time the viscosity of the reaction mixture was only V (40% NV in 2-butoxyethanol-1). Another shot of catalyst, 28 gms. of sodium acetate trihydrate in 280 gms. of DI water, was added below the surface. The reaction mixture was then held at 350° F. for another 4 hours. At the end of that time, the viscosity of the advanced epoxy resin was Y (40% NV in 2-butoxyethanol-1).

At that time the reactor was sealed and 242 lbs. of n-butanol was pumped into the reactor below the surface. The temperature of the reactor was allowed to drop to 235° F. (113° C.). After the n-butanol was added, a monomer mixture consisting of the following:

69 lbs. of methacrylic acid
36 lbs. of styrene
439 gms. (0.97 lbs.) of ethyl acrylate
9.4 lbs. of BPO (78% NV in H₂O)
27 lbs. of 2-butoxyethanol-1 was added over a period of 2 hours. Once the monomer mixture was added, 15 lbs. of n-butanol was added into the reactor through the monomer feed tank. The graft polymer resinous reaction product was then held at 237° F. (114° C.) for 3 hours. At the end of the hold, the viscosity was obtained as M-N (1 pt. resin in 1 pt. N-methylpyrrolidone).

The resinous reaction product was then dropped into a reducing tank, over a period of about 1 hour. The reducing tank contained 1134 lb. of DI water, 64 lb. of n-butanol, and 50 lb. of dimethyl ethanolamine. The reducing tank components were heated to about 150° F. (65° C.) before the drop. After the resinous reaction product was dropped into the reducing tank, 160 lb. of DI water was added. The constants for the dispersion were:

NV=23.4%
AN=80.9
BN=58
Viscosity=72 secs. #4 Ford cup
OS/S=0.92

This dispersion was useful in its own right, in the formulation of sprayable can coatings (see particularly related patent application Ser. No. 788,611). However, for present purposes, it was used to demonstrate a variant embodiment of the present invention.

Thus, 2420 gms. of this dispersion, 716 gms. of DI water, 18 gms. of dimethyl ethanolamine, 165 gms. of styrene, 25 gms. of methacrylic acid, and 190 gms. of polybutadiene (Lithene PL from Revertex Corp. England), were charged into a 5 liter round bottom flask equipped with agitator, N₂ inlet, condenser and a thermometer. The mixture was stirred for an hour and then heated to 55° C., 4 gms. of sodium formaldehyde sulfoxylate in 40 gms. of DI water, and 4.14 gms. t-BHP in 40 gms. of water were added. The temperature was then raised to 75° C. and held there for 2 hours. After the end of two hours, a chaser of 2 gms. of sodium formaldehyde sulfoxylate in 20 gms. of water and 2.2 gms. of t-BHP in 20 gms. of water was added to the reaction mixture and held for 1 hour at 75° C. At the end of the hour hold, the chaser step was repeated.

The constants for the final material were:
NV=24.1%
AN=73.4
BN=56.4
Viscosity=15 sec. #4 Ford Cup
Epoxy: polybutadiene: Acrylic=47:20:33

This material made an excellent spray coating and was particularly well suited for formulation with crosslinkers and pigment.

This example was repeated twice with two different extender polymers respectively. Considering the foregoing detailed demonstration as producing a product dispersion 16A, a product 16B was similarly made by substituting as the extender polymer polybutene 24 from Chevron Chemical Co., and a product 16C was similarly made by substituting as the extender polymer Cumar-R1, a coumarone-indene resin from Neville Chemical Co.

The constants and compositions for these three products were presented for comparison, as follows:

|  | Product | | |
|---|---|---|---|
| Properties | 16A | 16B | 16C |
| % Non-Volatile | 24.1 | 23.9 | 23.5 |
| Viscosity (#4 Ford Cup at 25° C.) | 15 sec. | 15 sec. | 16 sec |
| Acid Number | 73.4 | 73.8 | 75.7 |
| Base Number | 56.4 | 48.3 | 53.8 |
| % Neutralization | 76.8 | 65.5 | 71.1 |
| Ratio of n-butanol to 2-butoxyethanol-1 | 75/25 | 75/25 | 75/25 |
| OS/S | 0.55 | 0.55 | 0.55 |
| Composition |  |  |  |
| Epoxy | 47 | 47 | 47 |
| Extender Polymer | 20 | 20 | 20 |
| Acrylic | 33 | 33 | 33 |
| Type of Extender Polymer | Polybutadiene | Polybutene | Coumarone Indene Copolymer |

Example 17

Coating Composition: Epoxy:Acrylic:Acrylic Addition of Acrylic Extender Polymer Prior to the In Situ Polymerization In this demonstration of the third preferred embodiment of the invention, an acrylic copolymer is used as the extender polymer, and is formed in the presence of the earlier-formed graft polymer. The initial step was that of advancing a liquid epoxy resin.

438 gms of a liquid epoxy resin (Epon 828), Shell Chemical Co., 248 gms of Bisphenol A, 23 gms of xylene and 125 gms of 2-butoxy-ethanol-1, were charged into a 5 liter round bottom flask equipped with a N₂ inlet, condenser, stirrer and a thermometer. The reaction mixture was heated to 50° C., then a mixture of 0.32 g. of sodium acetate trihydrate and 3.6 gms of water was added. When the temperature reached 120° C., a vacuum of 18″ was applied to the reaction mixture and heating continued.

At 140° C. the heating was stopped and a small exotherm was observed. The vacuum was broken off. 23 gms of liquid had collected in the vacuum trap. Heating was continued until the temperature reached 175° C. At that time the temperature was stabilized for 3 hrs. At the end of that time, the viscosity of the resin mixture was $Z_1 + \frac{1}{2}$ (40% NV in 2-butoxyethanol-1). 484 gms of n-butanol were then added slowly, and the temperature was then stabilized at 110° C.

For the grafting step, a monomer mixture was made up of:

|  | Gms. |
|---|---|
| Methacrylic acid | 114 |
| Styrene | 60 |
| Ethyl acrylate | 1.6 |
| BPO | 15.5 |
| 2-butoxyethanol-1 | 45 |

This mixture was slowly added over a two hour period to the resin base while maintaining the temperature of the resin at 110° C. 25 gms of n-butanol were then added and the reaction mixture was held at 110° C. for 3 hours.

To add the extender polymer at this point, preparations were made to form an acrylic copolymer in the presence of the graft polymer prepared in the preceding reaction. To this end, a monomer mixture was made up of:

|  | Gms. |
|---|---|
| Styrene | 1238 |
| Methacrylic acid | 185.5 |
| BPO | 9.1 |
| n-Butanol | 436 |
| 2-butoxyethanol-1 | 172 |

This mixture was added over $2\frac{1}{2}$ hrs. to the graft polymer-containing reaction mixture while the temperature was held at 110° C. After the addition was completed, 47 gms of n-butanol was added and the reaction mixture was held another 2 hrs. at 110° C. At the end of the 2 hr. hold period, a chaser which contained 9.1 gms of BPO and 20 gms xylene was added, and the reaction mixture was then held for another hour. The mixture of acrylic copolymer-extender and of graft polymer resinous reaction product was then ready to be dispersed in water. The resin viscosity was $M^{\frac{1}{2}}$ as measured by dissolving 1 part of the resin solution in 1 part of N-methyl pyrrolidone.

Only a portion of the resin solution was dispersed in water. Thus, 2747 gms of the resin solution was slowly dropped into an aqueous mixture composed of 3911 gms of deionized water and 152 gms of dimethyl ethanolamine. The constants for the aqueous dispersion were:
NV = 21.1%
AN = 93.8
BN = 64.9
Viscosity = 3 min. #4 Ford Cup
OS/S = 0.69

To carry out the in situ vinyl polymerization step, 2592 gms of the above dispersion, 165 gms of styrene, and 25 gms of methacrylic acid were charged into a 5 liter round bottom flask equipped with a stirrer, $N_2$ inlet, thermometer and a condenser. To this reaction mixture 0.95 gms of sodium formaldehyde sulfoxylate in 20 gms of DI water was added.

The reaction mixture was heated to 50° C. and then 2.1 gms of t-butyl hydroperoxide (90% in water) in 20 gms of DI water was added. The temperature was then raised to 80° C. and at that temperature the reaction mixture was held for 1 hour. At the end of the 1 hour hold period, a chaser, which contained 0.19 gms of sodium formaldehyde sulfoxylate in 10 gms of DI water and 0.21 gms of t-BHP in 10 gms of water, was added, and the contents of the flask were held at 80° for additional 1 hour.

At the end of second hold period, a second chaser was added, and held at 80° for another hour. Then 18 gms of dimethyl ethanolamine and 16 gms water were added, and the reaction mixture was held for 1 more hour. Then the heat was turned off and the reaction mixture was cooled to room temperature while stirring. The final constants for this material were:
NV = 25.0%
AN = 86.0
BN = 62.4
Visc. = 42 sec. #4 Ford Cup This dispersion was useful as a sprayable, water-reducible coating composition. The Acid Number is adequate to maintain the solids dispersed over long storage periods, with substantially no settling or change in viscosity or pH. This formulation is a particularly remarkable achievement, since the contribution of the epoxy resin to overall final solids content is below 25% by weight. The acrylic extender provides the major contribution to the solids (in the neighborhood of two-thirds by weight).

Conclusion

Compositions prepared in accordance with the present invention are useful directly as coating compositions, or as the base from which coating compositions can be formulated. However, in its preferred embodiments, the invention is concerned with the formulation of water-reducible, sprayable compositions that can be used for coating cans for beverages, especially beer cans.

Such coatings prepared in accordance with the invention can be formulated to offer economy, relatively low ratio of organic solvents to solids (an important environmental consideration), and the achievement of sprayable consistencies with the least organic solvent content feasible. Moreover, such coatings can be formulated to exhibit little discernible change in either viscosity or pH after extended room temperature storage, indicating the absence of gelation and the existence of "stable" dispersions (as that term is used herein).

Beer can coating compositions prepared in accordance with preferred embodiments of the present invention can be formulated to exhibit good stability, turbidity resistance, blush properties, and adhesion to cans, whether made of aluminum, steel, tin plate, or other material. Such coating compositions can be formulated to cure in a few seconds at 450° F. or so (about 230° C.), and also at lower temperatures such as 350° F. (177° C.), and to exhibit superior properties as to resin volatilization (fuming). When filled, a properly coated can may be exposed to elevated temperatures, as during pasteurization, without blush. Properly coated cans prepared from preferred and appropriate formulations impart little or no taste to the beverage, and the beverage should not develop undesirable flavor notes, turbidity, or haze.

In addition, the coatings can be formulated to permit the necessary forming operations to be accomplished on the coated metal substantially without the development of cracks, pin-holes, or the like. Preferred coatings are resistant to pasteurization temperatures and are substantially free of components that might migrate into the beverage during pasteurization or storage.

While compositions prepared in accordance with the invention are primarily intended for use as liquid coatings, they may be reduced to powders for application or for reconstitution to flowable form.

The process of the invention can make more efficient use of manufacturing equipment per unit of solids sold, and thus can reduce costs and the need for additional reactor capacity.

While the grafting and in situ polymerization steps have been described and exemplified herein as each comprising a single polymerization step, there may be two or even more successive such polymerizations for each such step, depending upon the final properties and compositions desired.

Water dispersion sanitary coating compositions made in accordance with preferred embodiments of this invention can be formulated to perform well when sprayed by both air and airless devices, with atomization being obtainable with any type of nozzle or pressure, that is, spraying applications can be made at pressures in the range from 2 psi up to 1,500 psi. These compositions generally have excellent application properties, and generally their use is free from problems with respect to blistering, sagging, solvent washing, foaming, and excess flow.

Coating materials made in accordance with the invention can be applied to tin plate, aluminum, and to metal coated with primers, in a range of application thicknesses producing cured weights per 12-ounce can in the range from 1 to 10 mgs/in, which is 50 to 300 mgs. per 12-ounce can. Film continuity generally is readily attainable throughout this range.

While the invention has been disclosed by reference to the details of preferred embodiments thereof, it is to be understood that such disclosure is intended in an illustrative rather than in a limiting sense, and it is contemplated that various modifications in the compositions and processing techniques, in particular, will readily occur to those skilled in the art, within the spirit of the invention and within the scope of the appended claims.

What is claimed is:

1. A process comprising reacting:
    (a) a tractable grafting base comprising:
        (i) a 1,2-epoxy resin having an epoxy equivalent weight of at least 500 and
        (ii) a second, extender polymer selected from polystyrene, low molecular weight polyethylene, styrene-acrylate copolymer, ethylene-vinyl acetate copolymer, a hydroxyl terminated polyester or polyurethane, styrene-acrylonitrile copolymer, a hydrocarbon resin, a second epoxy resin, or a mixture thereof;
    said 1,2 epoxy resin and said extender polymer having aliphatic backbone carbon atoms including carbons having only one or two hydrogens bonded thereto, each of said 1,2 epoxy resin and said extender polymer contributing at least 10% by weight of the total solids present, and
    (b) vinyl monomer that is addition polymerizable through its ethylenic unsaturation selected from ethylenically acrylic or methacrylic acid, styrene, ethylenically unsaturated acid esters, or mixtures thereof; and
    in the presence of a free radical initiator that is characterized by its ability to abstract hydrogen, at a temperature and in sufficient quantity that said initiator is operative simultaneously to cause addition polymerization of the monomer and to cause graft polymerization by carbon-to-carbon bonds of addition polymer to at least some of said aliphatic backbone carbons that have one or two hydrogens bonded thereto in the ungrafted state.

2. The process of claim 1 wherein the epoxy resin is an adduct of a bisphenol and a diglycidyl ether of a bisphenol and wherein said adduct has an epoxy equivalent weight of at least 2,000 and constitutes at least 45% of the grafting base by weight.

3. The process of claim 2 wherein the epoxy resin is one that has been advanced in the presence of the extender polymer.

4. The process of claim 1 wherein the vinyl monomer includes an acrylic acid in sufficient quantity to establish the resinous product as a dispersion in a basic aqueous medium.

5. The process of claim 1 wherein said ethylenically unsaturated compound comprises an unsaturated primary or secondary amine, present in sufficient quantity to establish the resinous reactin product as a dispersion in an acidic aqueous medium.

6. The process of claim 1 wherein said ethylenically unsaturated compound comprises a compound having in its molecule an epoxy group that can be rendered base functional by reaction with a primary or secondary amine.

7. A resinous reaction product comprising a mixture of resinous solids, said solids being made up of components comprising:
    (i) addition polymerizable monomer selected from ethylenically acrylic or methacrylic acids, styrene, ethylenically unsaturated acid esters, or mixtures thereof;
    (ii) an aromatic 1,2-epoxy resin having an epoxy equivalent weight of at least 500;
    (iii) an extender polymer selected from polystyrene, low molecular weight polyethylene, styrene-acrylate copolymer, an ethylene-vinyl acetate copolymer, a hydroxyl terminated polyester or polyurethane, styrene-acrylonitrile copolymers, hydrocarbon resin, a second epoxy resin, or mixtures thereof;
    wherein each of said 1,2-epoxy resin and said extender polymer have aliphatic backbone carbon atoms that have one or more hydrogens bonded thereto, and
    (iv) graft polymers of each of the epoxy resin and the extender polymer in which addition polymer side chains are grafted by carbon-to-carbon bonds to at least some of said aliphatic backbone carbon atoms of the resin and of the polymer that had one or two hydrogens bonded thereto in the ungrafted state.

8. The resinous reaction product of claim 7 wherein the solids include a sufficient number of ionizable sites to establish the reaction product as a dispersion in an aqueous ionizing medium.

9. The resinous reaction product of claim 8 wherein the ionizable sites are located in the side chains of said graft polymers and in said addition polymerized monomer.

10. The reaction product of claim 9 wherein the solids are acid functional and wherein the acid-functionality is sufficiently high to establish the resinous reaction product as a dispersion in a basic aqueous ionizing medium.

11. The resinous reaction product of claim 9 wherein the solids are base functional and wherein the base functionality is sufficiently high to establish the resinous reaction product as a dispersion in an acidic aqueous ionizing medium.

* * * * *